United States Patent
Takamoto et al.

(10) Patent No.: US 9,284,016 B2
(45) Date of Patent: Mar. 15, 2016

(54) BICYCLE COMPONENT CONTROL APPARATUS

(75) Inventors: Ryuichirou Takamoto, Osaka (JP); Yoshiyuki Kasai, Osaka (JP); Mao Kuroda, Osaka (JP); Tadashi Ichida, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 253 days.

(21) Appl. No.: 13/411,802

(22) Filed: Mar. 5, 2012

(65) Prior Publication Data

US 2012/0253606 A1    Oct. 4, 2012

Related U.S. Application Data

(63) Continuation-in-part of application No. 13/076,994, filed on Mar. 31, 2011.

(51) Int. Cl.
| | |
|---|---|
| *B62M 6/45* | (2010.01) |
| *B62J 15/00* | (2006.01) |
| *B62M 6/90* | (2010.01) |
| *H02J 1/14* | (2006.01) |
| *B60L 1/08* | (2006.01) |

(Continued)

(52) U.S. Cl.
CPC .. *B62M 6/45* (2013.01); *B60L 1/08* (2013.01); *B60L 11/007* (2013.01); *B60L 11/1862* (2013.01); *B62J 15/00* (2013.01); *B62M 6/90* (2013.01); *H02J 1/14* (2013.01); *B60L 2200/12* (2013.01); *B60L 2240/547* (2013.01); *B60L 2240/80* (2013.01); *B60L 2250/16* (2013.01); *Y02T 10/7005* (2013.01); *Y02T 10/705* (2013.01); *Y02T 10/7044* (2013.01); *Y02T 10/7258* (2013.01)

(58) Field of Classification Search
CPC ....... B60G 17/015; F16H 59/00; G06F 19/00; Y02T 10/7005; Y02T 90/16; B62K 3/00; B62K 2007/00; B62K 2008/00; B60Y 2200/13; G01R 31/3648; G01R 31/3627; G01R 31/3662; G01R 31/3631; Y02E 60/12
See application file for complete search history.

(56) References Cited

U.S. PATENT DOCUMENTS

| | | | | |
|---|---|---|---|---|
| 5,664,636 | A | * | 9/1997 | Ikuma et al. ............... 180/206.1 |
| 5,667,233 | A | * | 9/1997 | Metzinger .................... 280/238 |

(Continued)

FOREIGN PATENT DOCUMENTS

| | | |
|---|---|---|
| DE | 196 00 243 A1 | 7/1997 |
| EP | 0 888 960 A2 | 1/1999 |

(Continued)

OTHER PUBLICATIONS

European Search Report of corresponding EP Application No. 12 16 0866.5 dated Aug. 1, 2012.

(Continued)

*Primary Examiner* — Bao Long T Nguyen
(74) *Attorney, Agent, or Firm* — Global IP Counselors

(57) ABSTRACT

A bicycle component control apparatus is basically provided with a controller that is configured to operate a first electrical bicycle component in response to receiving a first signal from a first input member, and to operate a second electrical bicycle component in response to receiving a second signal from a second input member. The controller is configured to prohibit operation of the second electrical bicycle component upon starting operation of the first electrical bicycle component.

24 Claims, 17 Drawing Sheets

(51) Int. Cl.
    *B60L 11/00*    (2006.01)
    *B60L 11/18*    (2006.01)

(56) References Cited

U.S. PATENT DOCUMENTS

| | | | |
|---|---|---|---|
| 5,798,702 A * | 8/1998 | Okamoto et al. | 340/636.1 |
| 5,878,831 A * | 3/1999 | Saito et al. | 180/206.2 |
| 5,971,116 A | 10/1999 | Franklin | |
| 6,260,649 B1 * | 7/2001 | Carney, Jr. | 180/220 |
| 6,446,745 B1 | 9/2002 | Lee et al. | |
| 6,646,400 B2 * | 11/2003 | Uno | 318/479 |
| 6,859,701 B2 * | 2/2005 | Vollmer et al. | 701/36 |
| 7,065,434 B2 * | 6/2006 | Uno | 701/36 |
| 7,123,155 B2 * | 10/2006 | Schinner | 340/636.1 |
| 7,165,641 B2 * | 1/2007 | Kitamura | 180/206.2 |
| 7,288,038 B2 | 10/2007 | Takeda et al. | |
| 7,595,642 B2 * | 9/2009 | Doyle | 324/426 |
| 7,798,929 B2 * | 9/2010 | Takamoto et al. | 474/80 |
| 7,874,567 B2 | 1/2011 | Ichida et al. | |
| 8,188,876 B1 * | 5/2012 | Holley et al. | 340/636.15 |
| 8,429,061 B2 * | 4/2013 | Shirai | 705/37 |
| 8,473,130 B2 * | 6/2013 | Brady et al. | 701/22 |
| 8,596,663 B2 * | 12/2013 | Shirai | 280/276 |
| 8,788,112 B2 * | 7/2014 | Schusser et al. | 701/1 |
| 2002/0008495 A1 | 1/2002 | Dougherty et al. | |
| 2004/0195025 A1 | 10/2004 | Kitamura | |
| 2005/0280244 A1 * | 12/2005 | Watarai | 280/288.4 |
| 2008/0091322 A1 * | 4/2008 | Phipps et al. | 701/48 |
| 2008/0269958 A1 * | 10/2008 | Filev et al. | 701/1 |
| 2009/0192673 A1 | 7/2009 | Song et al. | |
| 2010/0327542 A1 * | 12/2010 | Hara et al. | 280/5.503 |
| 2011/0202236 A1 * | 8/2011 | Galasso et al. | 701/37 |
| 2011/0238250 A1 * | 9/2011 | Takao | 701/22 |
| 2012/0239248 A1 * | 9/2012 | Bobbitt | 701/36 |
| 2012/0316710 A1 * | 12/2012 | Saida | 701/22 |
| 2013/0334874 A1 * | 12/2013 | Shirai | 307/9.1 |

FOREIGN PATENT DOCUMENTS

| | | |
|---|---|---|
| EP | 2 269 903 A1 | 1/2011 |
| EP | 2 309 352 A1 | 4/2011 |
| JP | 1-145215 A | 6/1989 |
| JP | 2003-312570 A | 11/2003 |
| JP | 2007-45339 A | 2/2007 |
| WO | WO 99/59860 A1 | 11/1999 |

OTHER PUBLICATIONS

European Search Report of corresponding EP Application No. 12 16 0847.5 dated Aug. 2, 2012.

* cited by examiner

BICYCLE COMPONENT CONTROL APPARATUS

CROSS-REFERENCE TO RELATED APPLICATIONS

This application is a continuation-in-part application of U.S. patent application Ser. No. 13/076,994 filed on Mar. 31, 2011. The entire disclosure of U.S. patent application Ser. No. 13/076,994 is hereby incorporated herein by reference.

BACKGROUND

1. Field of the Invention

This invention generally relates to a control apparatus that is configured to control a bicycle component. More specifically, the present invention relates to a bicycle component control apparatus for controlling an electrically adjustable component.

2. Background Information

In recent years, some bicycles are provided with electrically adjustable components. Examples of some these electrically adjustable components include suspensions, derailleurs and a seatpost. Often these electrically adjustable components are provided with an electric unit that includes such parts as a motor or other drive device for adjusting the electrically adjustable component and a position sensor for detecting a position of the electrically adjustable component. Typically, bicycles equipped with electrically adjustable components are also provided with an electrical power supply such as a battery or a generator for supply electrical energy to the electrically adjustable components.

One example of a conventional bicycle electrical system is disclosed in Japanese Laid-Open Patent Publication No. 2003-312750. The conventional bicycle electrical system of this publication has two electric components connected with an electric power communication line. This conventional bicycle electrical system also has a control unit provided on a front derailleur and an operating unit provided on a handlebar. This conventional bicycle electrical system uses an electric power line communication technology to connect the control unit and the operating unit through the electric power line. Other electric components are connected to the control unit with signal lines.

SUMMARY

In view of the state of the known technology, a bicycle component control apparatus is disclosed herein that simultaneously operates at least two electrical bicycle components while a power level of a power supply is above a prescribed power level, and operates the two electrical bicycle components at different starting times while the power level is below the prescribed power level.

In one embodiment, a bicycle component control apparatus is provided that basically comprises a controller that is configured to operate a first electrical bicycle component in response to receiving a first signal from a first input member, and to operate a second electrical bicycle component in response to receiving a second signal from a second input member. The controller is configured to prohibit operation of the second electrical bicycle component upon starting operation of the first electrical bicycle component.

These and other objects, features, aspects and advantages of the bicycle component control apparatus will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
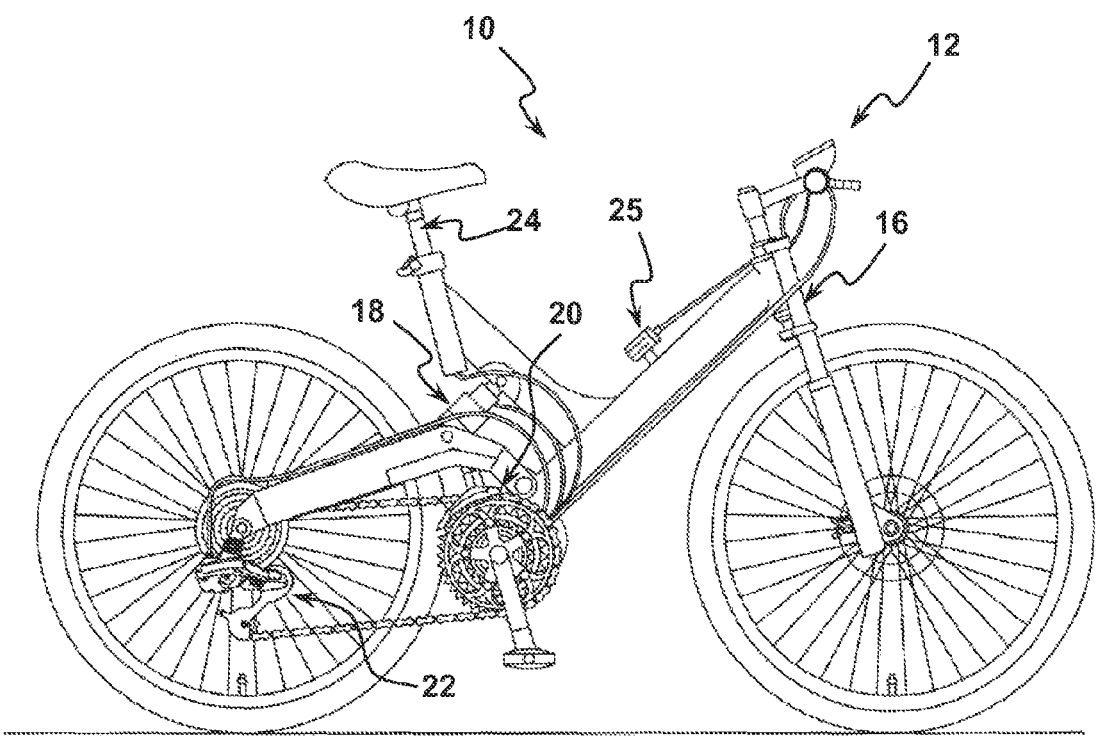
FIG. 1 is a side elevational view of a bicycle that is equipped with a bicycle component control apparatus in accordance with one embodiment.

Referring initially to FIG. 1, a bicycle 10 is illustrated that is equipped with a bicycle component control apparatus 12 for controlling the operations of various electrical bicycle components in accordance with one illustrated embodiment. In the illustrated embodiment, the bicycle component control apparatus 12 is provided with a controller 14 mounted on a handlebar 15, an electrically adjustable front suspension 16, an electrically adjustable rear suspension 18, an electrically operated front derailleur 20 (e.g., a front shift device), an electrically operated rear derailleur 22 (e.g., a rear shift device) and an electrically operated seatpost 24. The front suspension 16, the rear suspension 18, the front derailleur 20, the rear derailleur 22 and the seatpost 24 constitute examples of electrical bicycle components that are at least partially controlled by the controller 14 based on an operation of one or more manually operated input members or devices as discussed below. Thus, the front suspension 16, the rear suspension 18, the front derailleur 20, the rear derailleur 22 and the seatpost 24 will be collectively referred to as the electrical bicycle components 16, 18, 20, 22 and 24 for the sake of convenience. However, the bicycle component control apparatus 12 is not limited to the electrical bicycle components 16, 18, 20, 22 and 24 described and illustrated herein. Rather, the bicycle component control apparatus 12 can have only one of the components 16, 18, 20, 22 and 24, or any combination of the electrical bicycle components 16, 18, 20, 22 and 24 as well as other electrical bicycle components (not shown) as needed and/or desired. In any event, in the illustrated embodiment, the controller 14 is configured to control an operation of each of the electrical bicycle components 16, 18, 20, 22 and 24 by selectively outputting a control parameter to the electrical bicycle components 16, 18, 20, 22 and 24 for selectively controlling an operating state of the electrical bicycle components 16, 18, 20, 22 and 24, as discussed below.

Figure 3:
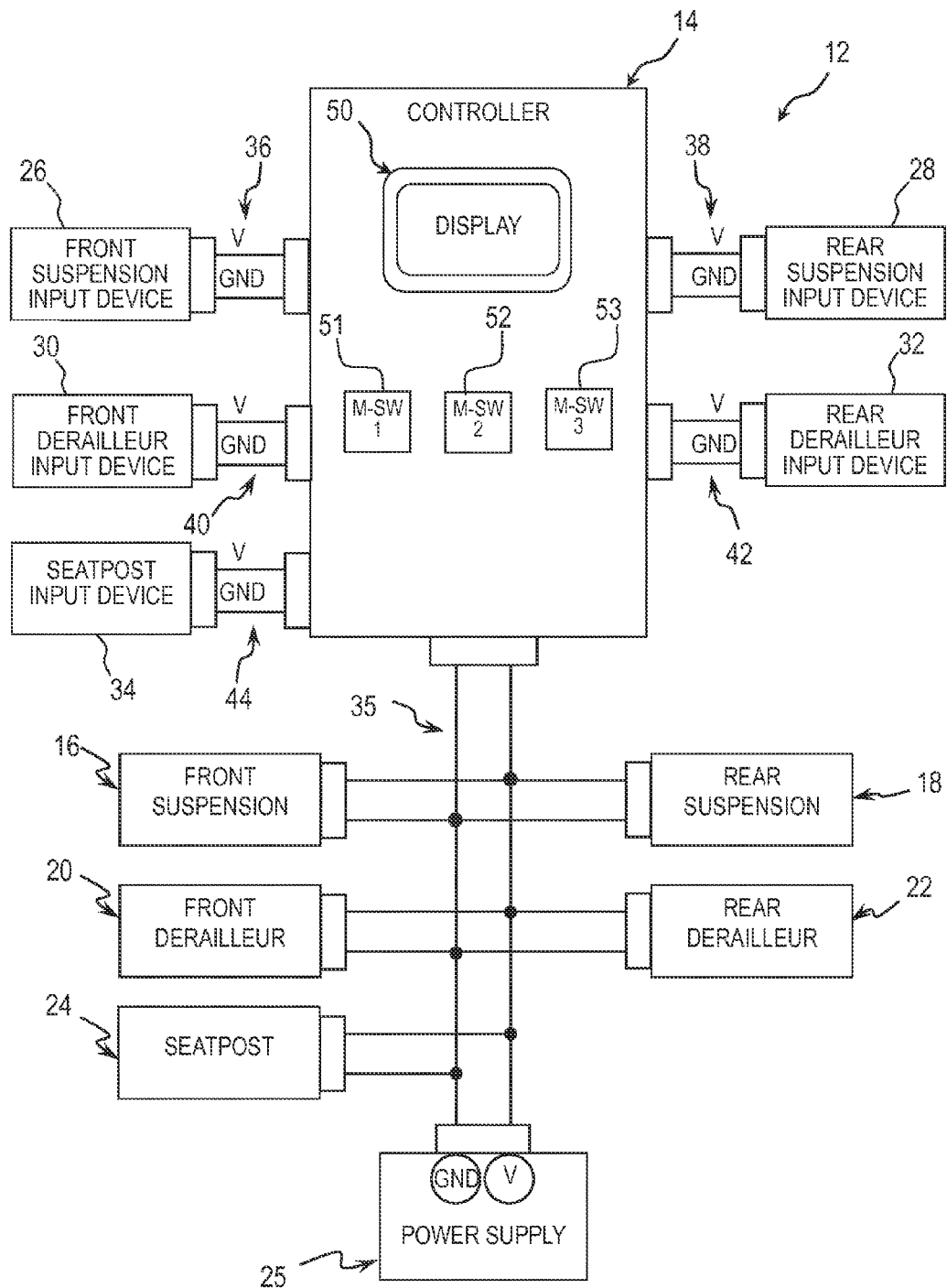
FIG. 3 is a schematic block diagram showing an entire configuration of the bicycle component control apparatus.

As seen in FIGS. 1 and 3, the bicycle component control apparatus 12 is also provided with a power supply 25 (e.g., a battery as shown) for supplying electrical power to the controller 14 and the electrical bicycle components 16, 18, 20, 22 and 24. In other words, the power supply 25 constitutes an electrical energy storage device or storage element that serves as a power source for the electrical components of the bicycle 10. The power supply 25 is not limited to a battery as the power supply. Rather, for example, a generator by itself or a generator in conjunction with a battery can be used for the power supply of the controller 14 and the electrical bicycle components 16, 18, 20, 22 and 24. The power supply 25 is a battery in the illustrated embodiment. The battery of the power supply 25 can be, for example, a nickel hydrogen battery or a lithium ion battery. For example, the power supply 25 preferably supplies a power supply voltage V of about V1 volts (DC) to the controller 14 and the electrical bicycle components 16, 18, 20, 22 and 24.

Figure 2:
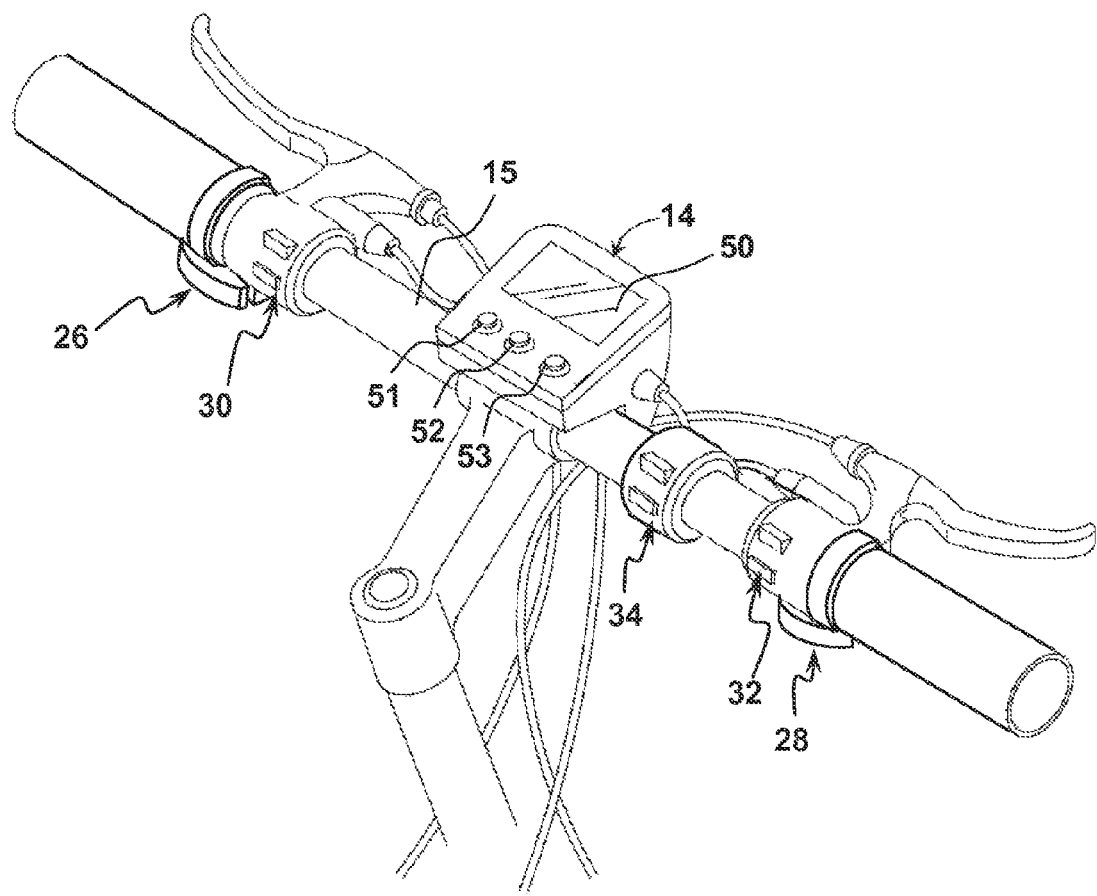
FIG. 2 is a perspective view of the handlebar area of the bicycle illustrated in FIG. 1, with a control unit and a plurality of operating or input devices mounted to a straight type handlebar.

Referring to FIGS. 2 and 3, the bicycle component control apparatus 12 is further provided with a front suspension input device 26, a rear suspension input device 28, a front derailleur input device 30, a rear derailleur input device 32 and a seatpost input device 34. The input devices 26, 28, 30, 32 and 34 are each operatively coupled to the controller 14. Each of the input devices 26, 28, 30, 32 and 34 selectively outputs an input signal to the controller 14 to change a setting of the electrical bicycle components 16, 18, 20, 22 and 24 in accordance with a control parameter that is outputted by the controller 14, as discussed below. The term "signal" as used herein is not limited to an electrical signal, but includes other types of signals such as a command.

As explained below in more detail, the controller 14 is configured to selectively change various setting states of the electrical bicycle components 16, 18, 20, 22 and 24 in response to a manual input from a rider (i.e., a manual component adjustment mode) or an automatic input from a control program in the controller 14 (i.e., an automatic component adjustment mode). In other words, the controller 14 is configured to selectively change at least one electrically adjustable parameter of each of the electrical bicycle components 16, 18, 20, 22 and 24 either manually or manual input automatically.

Preferably, the controller 14 includes a non-priority setting, a power level priority setting, a component priority setting and a hybrid priority setting. The user can select the non-priority setting, the power level priority setting, the component priority setting or the hybrid priority setting as needed and/or desired. These priority settings can be used in both the manual component adjustment mode and the automatic component adjustment mode. While these settings and the control of the electrical bicycle components 16, 18, 20, 22 and 24 are illustrated as being performed by the controller 14, which functions as a master controller, the bicycle component control apparatus 12 is not limited to this arrangement. Rather, a master controller can be disposed on the controller 14, or on the power supply 25, or on one of the input devices 26, 28, 30, 32 and 34. For the sake of simplicity, the following description will present the example of the master controller being disposed on the controller 14. Of course, the bicycle component control apparatus 12 does not necessarily include the option of selecting a desired setting for controlling the order of actuation of the electrical bicycle components 16, 18, 20, 22 and 24. Rather, the bicycle component control apparatus 12 can include only one, only two, or only three of the non-priority setting, the power level priority setting, the component priority setting or the hybrid priority setting as needed and/or desired.

In the case of the non-priority setting, the electrical bicycle components 16, 18, 20, 22 and 24 are not ranked in any order for actuation. In other words, when in the non-priority setting, the electrical bicycle components 16, 18, 20, 22 and 24 are operated in accordance with the order that the input signals are received by or issued by the master controller (e.g., the controller 14). As mentioned above, one or more of the input devices 26, 28, 30, 32 and 34 can be configured to simultaneously operate two or more of the electrical bicycle components 16, 18, 20, 22 and 24, or the master controller (e.g., the controller 14) can issue a signal in the form of a command to simultaneously operate two or more of the electrical bicycle components 16, 18, 20, 22 and 24. When in the non-priority setting, two or more of the electrical bicycle components 16, 18, 20, 22 and 24 can be simultaneously operated, if sufficient power is available, upon the master controller (e.g., the controller 14) issuing or receiving a signal or signals requesting simultaneous operation of two or more of the electrical bicycle components 16, 18, 20, 22 and 24. When in the non-priority setting, the user will immediately know that the power level is low in the power supply 25 if two or more of the electrical bicycle components 16, 18, 20, 22 and 24 cannot be operated simultaneously. Thus, the user can switch to one of the priority setting so that simultaneous operation of two or more of the electrical bicycle components 16, 18, 20, 22 and 24 can be performed with minimal delay.

The logic of the non-priority setting is also preferably used in the power level priority setting and the hybrid priority setting when one or more signals are sequentially received or issued, which do not require simultaneous operation of two of the electrical bicycle components 16, 18, 20, 22 and 24.

As discussed below, when two or more of the electrical bicycle components 16, 18, 20, 22 and 24 are simultaneously started or started nearly simultaneously (i.e., within less than one second of each), the power needed from the power supply 25 is considerably higher as compared to when only one of the electrical bicycle components 16, 18, 20, 22 and 24 is activated. Thus, the power level priority setting, the component priority setting and the hybrid priority setting of the controller 14 are designed to avoid this peak power requirement from occurring while still obtaining the desired end operating states with only a minimal delay.

As mentioned above, in certain situations, the user may want two or more of the electrical bicycle components 16, 18, 20, 22 and 24 to be simultaneously operated (e.g., two of the input devices 26, 28, 30, 32 and 34 are simultaneously operated by the user, or a signal (command) is issued by the master controller based on the based on the operating conditions of the bicycle to perform a simultaneous operation of two or more of the electrical bicycle components 16, 18, 20, 22 and 24). To avoid a situation in which the electrical bicycle components 16, 18, 20, 22 and 24 are not operated as desired due to a low power level in the power supply 25, the user can switch to one of the priority setting so that simultaneous operation of two or more of the electrical bicycle components 16, 18, 20, 22 and 24 can be performed with only minimal delay.

Figure 7:
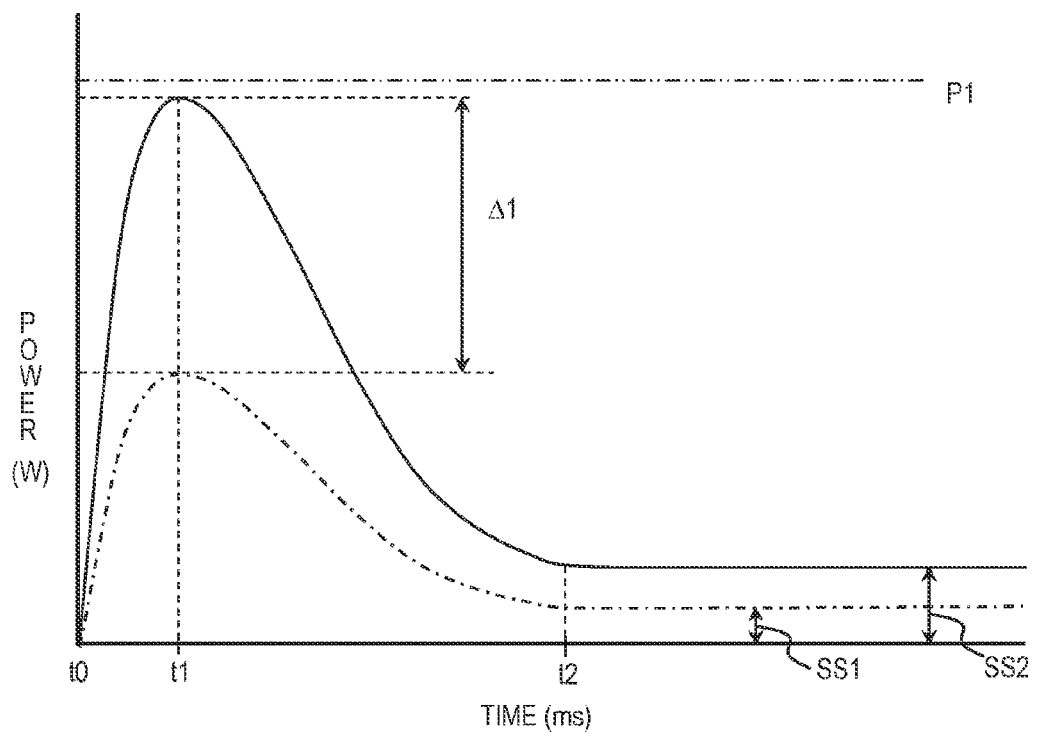
FIG. 7 is a graph illustrating the power fluctuation that occurs in the power line when simultaneously starting two electric actuators (e.g., electric motors) in comparison to starting a single actuator (e.g., electric motor)

Preferably, a power level requirement is determined for each of the electrical bicycle components 16, 18, 20, 22 and 24. As illustrated in FIG. 7, the power level requirement fluctuates such that the power level requirement is highest during an initial "starting operation" as compared to a "driving operation" that occurs after the starting operation. The term "starting operation" as used herein refers to the period of time that the power level requirement is increasing. The term "driving operation" as used herein refers to the period of time that the power level requirement is relatively steady. The term "power transitioning operation" as used herein refers to the period of time that the power level requirement is decreasing from the starting operation to the driving operation. Using the power level requirements of the electrical bicycle components 16, 18, 20, 22 and 24, a prescribed power level (a predetermined value) P1 can be determined for which two of the electrical bicycle components 16, 18, 20, 22 and 24 can be simultaneously operated at their peak power requirements. Preferably, the prescribed power level P1 is slightly higher than the sum of the peak power requirement values of the two of the electrical bicycle components 16, 18, 20, 22 and 24 that have the highest require power level requirements. Of course, the power level requirements do not have to be actually tested for each of the electrical bicycle components 16, 18, 20, 22 and 24 to determine the prescribed power level P1. Rather, the power level requirements of the electrical bicycle components can be estimated for determining the prescribed power level P1.

Depending on which one of the priority settings, which is selected by the user, the starting operations of the electrical bicycle components 16, 18, 20, 22 and 24 will be controlled differently. Generally, the priority setting are designed to allow the user to continue to operate the electrical bicycle components 16, 18, 20, 22 and 24 using the input devices 26, 28, 30, 32 and 34 in a normal manner, even when the power level of the power supply 25 has drop to a level that is insufficient to simultaneously operate two of the electrical bicycle components 16, 18, 20, 22 and 24. In other words, with the priority setting, the user can operate the input devices 26, 28, 30, 32 and 34 normally without concern about the power level of the power supply 25 so long as the power level of the power supply 25 is sufficient to operate each of the electrical bicycle components 16, 18, 20, 22 and 24 separately. By the controller 14 controlling the start timings, the user can simultaneously operate two of the input devices 26, 28, 30, 32 and 34, while the power level of the power supply 25 has drop to a level that is insufficient to simultaneously operate two of the electrical bicycle components 16, 18, 20, 22 and 24, and the controller 14 will adjust the start timings to ensure that both commands by the user are executed to obtain the desired end operating states with only a minimal delay.

In the case of the controller 14 being set to the power level priority setting, while the power level of the power supply 25 is above the prescribed power level P1, two or more of the electrical bicycle components 16, 18, 20, 22 and 24 can be simultaneously operated based on the manual inputs by the user and/or based on an automatic component adjusting program (e.g., an automatic shifting program, an automatic suspension adjusting program and/or seat height adjustment program) that control two or more of the electrical bicycle components 16, 18, 20, 22 and 24 based on the current detected operating conditions of the bicycle 10. However, as discussed below, while the controller 14 is set to the power level priority setting, when the power supply level of the power supply 25 becomes lower than the prescribed power level P1, the controller 14 will only allow the electrical bicycle components 16, 18, 20, 22 and 24 that normally operate in a simultaneous manner to be operated at different starting times. In other words, while the power level of the power supply 25 is below the prescribed power level P1, in the power level priority setting, the controller 14 will adjust the starting operations of the electrical bicycle components 16, 18, 20, 22 and 24 to avoid this peak power requirement from occurring. In this way, when the power supply level is below the prescribed power level P1, the bicycle component control apparatus 12 can still effectively operate the electrical bicycle components 16, 18, 20, 22 and 24 to obtain the desired end operating state with only a minimal delay. Also the controller 14 can be configured such that the prescribed power level P1 is adjustably by either the user and/or based on environmental conditions (e.g., temperature, season, etc.).

In the case of the controller 14 being set to the component priority setting, the controller 14 will control starting operations of the electrical bicycle components 16, 18, 20, 22 and 2 24 regardless of the power level of the power supply 25. By using a preselected ranking of the electrical bicycle components 16, 18, 20, 22 and 24, the controller 14 can avoid the need for the power supply 25 to be at a power level that is need for simultaneously starting or nearly simultaneously starting (i.e., within less than one second of each) of two or more of the electrical bicycle component based on a preselected ranking of the electrical bicycle components 16, 18, 20, 22 and ts 16, 18, 20, 22 and 24. Basically, the controller 14 avoids the need for a high power requirement by prohibiting operation of one of the electrical bicycle components 16, 18, 20, 22 and 24 while a starting operation of one of the other of the electrical bicycle components 16, 18, 20, 22 and 24 is occurring. In this way, the controller 14 sets different starting times for the electrical bicycle components 16, 18, 20, 22 and 24 when input signals of two or more of the electrical bicycle components 16, 18, 20, 22 and 24 are received simultaneously or nearly simultaneously (i.e., within less than one second of each) by the controller 14. However, since some of the electrical bicycle components 16, 18, 20, 22 and 24 may have a higher power requirement for starting its operation as compared to some of the other ones of the electrical bicycle components 16, 18, 20, 22 and 24, the controller 14 can set a rank that is equal for some of the electrical bicycle components 16, 18, 20, 22 and 24.

In the case of the controller 14 being set to the hybrid priority setting, the controller 14 will only restrict starting operations of the electrical bicycle components 16, 18, 20, 22 and 24 based on a preselected ranking of the electrical bicycle components 16, 18, 20, 22 and 24 while the power level of the power supply 25 is below the prescribed power level P1.

Referring to FIGS. 2 and 3, in the first illustrated embodiment, the input devices 26, 28, 30, 32 and 34 are mounted on the handlebar 15 of the bicycle 10. The input devices 26, 28, 30, 32 and 34 constitute examples of manually operated input members or devices in the form of switches. While the switches or input devices 26 and 28 are illustrated as being used to operate the front and rear suspensions 16 and 18, it will be apparent from this disclosure that the input devices 26 and 28 can be configured to operate one of the other electrical bicycle components 20, 22 and 24. For example, the input device 26 can be used to operate the front derailleur 20, the rear derailleur 22, or the seatpost 24 as needed and/or desired.

The power supply 25 is electrically coupled to the controller 14 and the electrical bicycle components 16, 18, 20, 22 and 24 via an electric power line 35. The power line 35 is a two conductor wiring harness having a ground wire GND and a power or voltage wire V with branches to the electrical bicycle components 16, 18, 20, 22 and 24. The power line 35 preferably has detachable type plug-in connectors for detachably connecting the power line 35 to the controller 14 and the electrical bicycle components 16, 18, 20, 22 and 24 in a reattachable manner.

In the illustrated embodiment of FIG. 3, the front suspension input device 26 is detachably connected to the controller 14 by an electric power line 36. The rear suspension input device 28 is detachably connected to the controller 14 by an electric power line 38. The front derailleur input device 30 is detachably connected to the controller 14 by an electric power line 40. The rear derailleur input device 32 is detachably connected to the controller 14 by an electric power line 42. The seatpost input device 34 is detachably connected to the controller 14 by an electric power line 44. Each of the power lines 36, 38, 40, 42 and 44 has a plug-in connector at each end. Preferably, each of the power lines 36, 38, 40, 42 and 44 is a two conductor wire having a ground wire GND and a power or voltage wire V.

In this embodiment, the front suspension 16 includes a pair of combination air-oil operated shock absorbers with various adjustment elements. Preferably, the front suspension 16 includes an adjustment element for low speed and high speed compression damping, an adjustment element for stroke (piston travel or compression chamber volume), an adjustment element for air chamber pressure, for rebound damping, an adjustment element for lockout actuation, and an adjustment element for lockout force adjustment. Examples of such parameter adjustments may be found in current shock absorbers sold by suspension manufacturers. Since numerous types of conventional front suspensions can be utilized for the front suspension 16, the structure of the front suspension 16 will not be discussed and/or illustrated in detail. The front suspension 16 is manually operated by the front suspension input device 26 for controlling a state (e.g., lockout/non-lockout, travel-stroke length and/or damping rate) of the front suspension 16.

In this embodiment, the rear suspension 18 includes a combination air-oil operated shock absorber with a typical external spring (not shown in the drawings). The rear suspension 18 includes various adjustment elements. Preferably, the rear suspension 18 includes an adjustment element for spring preload, an external adjustment element for low speed and high speed compression damping, an adjustment element for air chamber pressure adjustment, an adjustment element for air chamber volume adjustment, an adjustment element for rebound damping, an adjustment element for lockout actuation, and an adjustment element for lockout force adjustment. Examples of such parameter adjustments may be found in current shock absorbers sold by suspension manufacturers. Since numerous types of conventional rear suspensions can be utilized for the rear suspension 18, the structure of the rear suspension 18 will not be discussed and/or illustrated in detail. The rear suspension 18 is manually operated by the rear suspension input device 28 for controlling a state (e.g., lockout/non-lockout, travel-stroke length and/or damping rate) of the rear suspension 18.

In this embodiment, the front derailleur 20 is an electrically operated device that laterally shifts a chain between front sprockets. Since numerous types of conventional front derailleurs can be utilized for the front derailleur 20, the structure of the front derailleur 20 will not be discussed and/or illustrated in detail. The front derailleur 20 is manually operated by the front derailleur input device 30 for controlling a state (e.g., shift position) of the front derailleur 20.

In this embodiment, the rear derailleur 22 is an electrically operated device that laterally shifts a chain between rear sprockets. Since numerous types of conventional rear derailleurs can be utilized for the rear derailleur 22, the structure of the rear derailleur 22 will not be discussed and/or illustrated in detail. The rear derailleur 22 is manually operated by the rear derailleur input device 32 for controlling a state (e.g., shift position) of the rear derailleur 22.

In this embodiment, the seatpost 24 is an electrically operated device that moves a bicycle seat in a parallel direction with respect to a center axis of the seat tube. Since numerous types of extendible seatpost can be utilized for the seatpost 24, the structure of the seatpost 24 will not be discussed and/or illustrated in detail. The seatpost 24 is manually operated by a seatpost input device 34 for controlling a state (e.g., height or length) of the seatpost 24.

Figure 4:
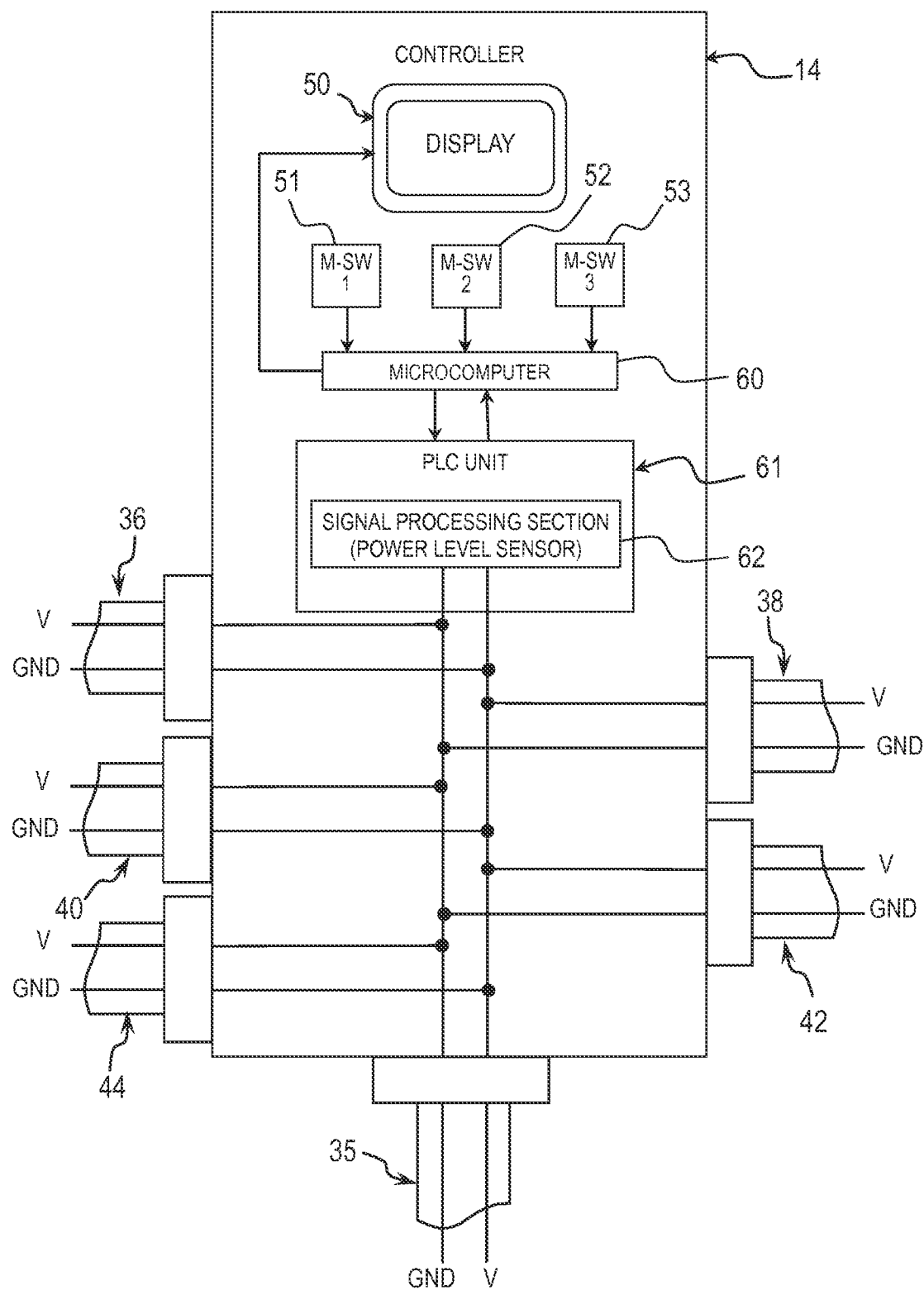
FIG. 4 is a schematic block diagram showing a basic configuration of the control unit of the bicycle component control apparatus.

Referring now to FIG. 4, a schematic block diagram is illustrated that shows a basic configuration of the bicycle component control apparatus 12. The controller 14 is provided with an integrated display 50 and three mode switches 51, 52 and 53 for controlling various modes of one or more of the input devices 26, 28, 30, 32 and 34. In other words, the mode switches 51, 52 and 53 are electrically connected to the controller 14 for controlling operation modes of controller 14 and operation modes of the input devices 26, 28, 30, 32 and 34. By using one or more of the mode switches 51, 52 and 53, the user can selectively change which of the electrically adjustable parameters are controlled by the input devices 26, 28, 30, 32 and 34. Moreover, the user can select one of the power level priority setting, the component priority setting and the hybrid priority setting as needed and/or desired. While the mode switches 51, 52 and 53 are illustrated as being integrated with the housing of the controller 14, one or more of the mode switches 51, 52 and 53 can be remotely located from the controller 14. Also the display 50 can be part of the controller 14, as illustrated, or can be a separate member that is electrically connected to the controller 14.

Using the mode switches 51, 52 and 53, the rider can change how the input devices 26, 28, 30, 32 and 34. For example, the input devices 26 and 28 can be switched between a lock out state adjustment mode, a travel-stroke length state adjustment mode and a damping rate state adjustment mode. Thus, the controller 14 is configured to selectively change various setting states of the electrical bicycle components 16, 18, 20, 22 and 24 in response to a manual input from a rider of the input devices 26, 28, 30, 32 and 34 or an automatic input from a control program in the controller 14. In other words, the controller 14 is configured to selectively change at least one electrically adjustable parameter of each of the electrical bicycle components 16, 18, 20, 22 and 24 either manually or automatically. Also as explained below, the controller 14 can be set, either manually or automatically, so that operation of one of the electrical bicycle components 16, 18, 20, 22 and 24 will result in two of the electrical bicycle components starting simultaneously. Moreover, in the case of simultaneous operation of the electrical bicycle components, the sequence of the start timings for moving the components are preferably preset in advance as default settings and stored in the memory of the controller 14. For example, if the front and rear suspensions are moved, the controller 14 will set the start timings of the front and rear suspensions such that the rear suspension initially starts to move before the front suspension starts to move. However, it is also preferable to permit the user to override the preset default settings, such that the user can change the sequence of the start timings.

In certain modes, the mode switches 51, 52 and 53 can be used to set the controller 14 such that the controller 14 operates two or more electrical bicycle components 16, 18, 20, 22 and 24 in a simultaneous manner. This simultaneous operation of two or more electrical bicycle components 16, 18, 20, 22 and 24 can be done automatically by the controller 14 in response to various bicycle traveling conditions that are detected, or manually in response to operation of one of the input devices 26, 28, 30, 32 and 34. For example, the bicycle can be equipped with an accelerometer for determining the inclination of the bicycle 10, a speed sensor that measures the rotation of the front wheel for determining the velocity of the bicycle 10 and/or a torque sensor that measures the torque applied to the crank arm for determining the pedaling force. Using the data from these sensors, the controller 14 automatically adjusts the operating states (e.g., setting lockout/non-lockout states, travel-stroke length states and/or damping rate states) of the front and rear suspensions 16 and 18 simultaneously and/or automatically adjusts the operating states (e.g., setting gear positions) of the front and rear derailleurs 20 and 22 simultaneously. Moreover, the controller 14 automatically adjusts the seatpost 24 simultaneously with the front and rear suspensions 16 and 18 and/or simultaneously with the front and rear derailleurs 20 and 22. Preferably, the controller 14 is configured such that the rider can manually set which of the electrical bicycle components 16, 18, 20, 22 and 24 are operated simultaneously based on the bicycle traveling conditions that are detected. In other words, the controller 14 can be programmed by the rider, or at the factory, for any combination of the electrical bicycle components 16, 18, 20, 22 and 24 to be operated simultaneously based on the bicycle traveling conditions that are detected. Moreover, the controller 14 can be programmed by the rider, or at the factory, such that manual operation of a single one of the input devices 26, 28, 30, 32 and 34 results in simultaneous operation of any combination of the electrical bicycle components 16, 18, 20, 22 and 24. As mentioned above, by the user selecting one of the power level priority setting, the component priority setting and the hybrid priority setting, the simultaneous operation of the electrical bicycle components 16, 18, 20, 22 and 24 may be prohibited and/or the be shifted to avoid the need for a high power requirement.

Figure 11:
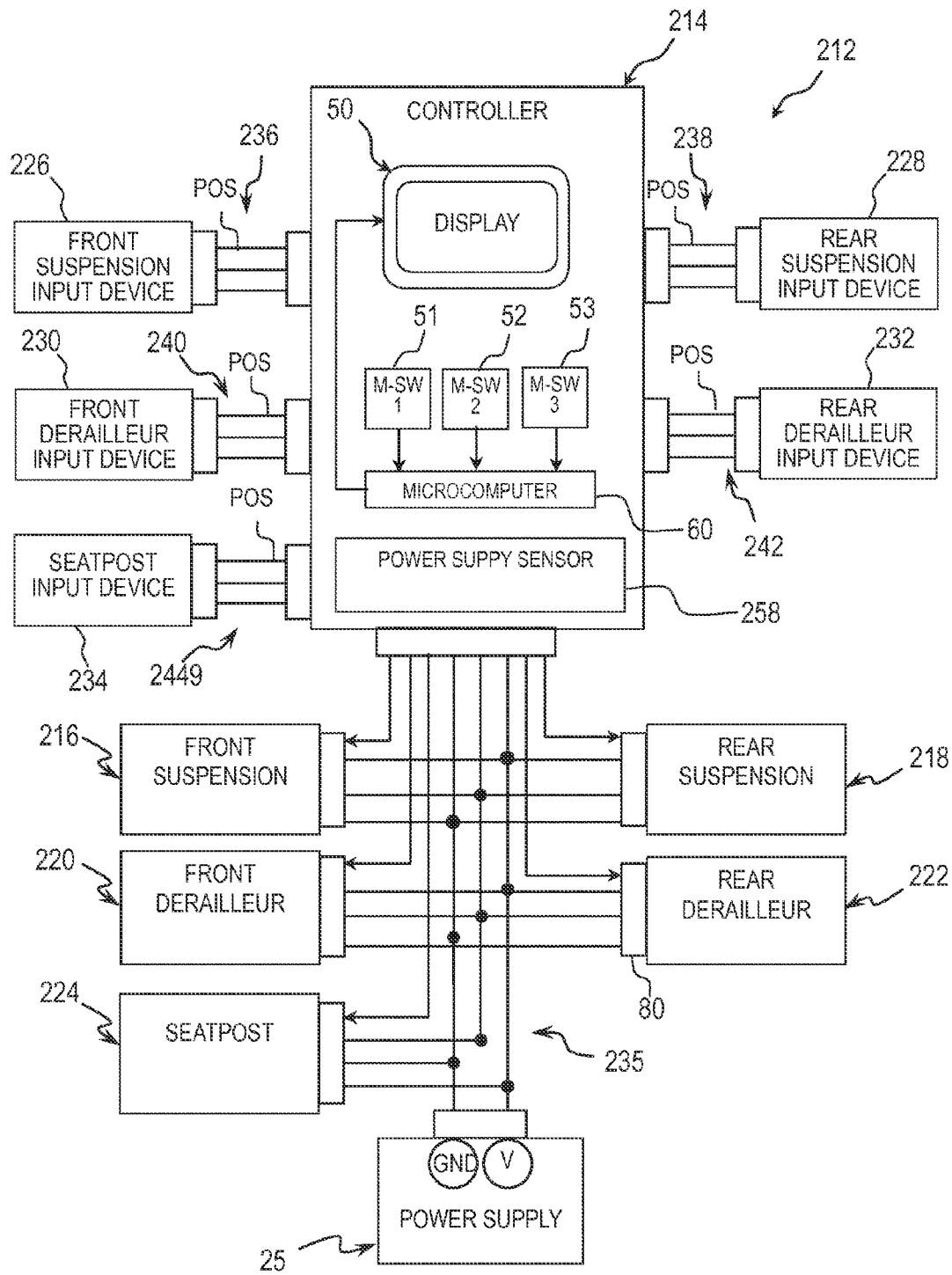
FIG. 11 is another alternative schematic block diagram showing an entire configuration of another alternative bicycle component control apparatus.

Still referring to FIG. 4, the controller 14 is also provided with a main microcomputer 60 and a power line communication (PLC) unit 61 that includes a signal processing section 62. The power line communication unit 61 is connected to the power supply 25 for receiving electric power. The power line communication unit 61 is part of a power line communication (PLC) system that is configured to execute two-way communications with each of the electrical bicycle components 16, 18, 20, 22 and 24, the power supply 25, and each of the input devices 26, 28, 30, 32 and 34 through the power lines 35, 36, 38, 40, 42 and 44. Thus, control signals or commands that control the electrical bicycle components 16, 18, 20, 22 and 24 are superimposed on the power source voltage flowing in the electric power lines 35, 36, 38, 40, 42 and 44 that interconnect the controller 14, the electrical bicycle components 16, 18, 20, 22 and 24, the power supply 25 and the input devices 26, 28, 30, 32 and 34. In this way, data can be transmitted between the controller 14 and the electrical bicycle components 16, 18, 20, 22 and 24 and the power supply 25 by the electric power line 35. Optionally, instead of using power line communications (PLC), in addition to a ground wire GND and a voltage wire V, separate signal wires can be provided for transmitting data as needed and/or desired as seen in FIG. 11.

In any event, in this first embodiment, the controller 14 outputs one or more predetermined control parameters to the electrical bicycle components 16, 18, 20, 22 and 24 via the power line 35 based on the operations of the input devices 26, 28, 30, 32 and 34. In the event of the power level of the power supply 25 falls below the prescribed power level P1, the controller 14 prohibit the electrical bicycle components 16, 18, 20, 22 and 24 from being simultaneously operated. Rather, upon determining the power level of the power supply 25 has fallen below the prescribed power level P1, the controller 14 will set different starting times for operating those electrical bicycle components 16, 18, 20, 22 and 24, which would otherwise be simultaneously operated.

The main microcomputer 60 includes control circuits with one or more CPUs, storage units, computation units and the like. The main microcomputer 60 also includes software that outputs the predetermined control parameters in accordance with adjustment signals outputted from the input devices 26, 28, 30, 32 and 34. In particular, using the signal processing section 62, the main microcomputer 60 outputs predetermined control parameters output based on the operation of the input devices 26, 28, 30, 32 and 34 to control the electrical bicycle components 16, 18, 20, 22 and 24 in accordance with adjustment signals outputted from the input devices 26, 28, 30, 32 and 34. The main microcomputer 60 forms part of a bicycle adjusting controller together with other microcomputers of the electrical bicycle components 16, 18, 20, 22 and 24 as explained below.

The signal processing section 62 constitutes a power level sensor that detects a power level of the power supply 25. The signal processing section 62 can be integrated into the main microcomputer 60 or a separate component as needed and/or desired. Moreover, a separate power level sensor can be used if needed and/or desire. The power level sensor can be any type of device that can determine or estimate the power level of the power supply 25.

Figure 5:
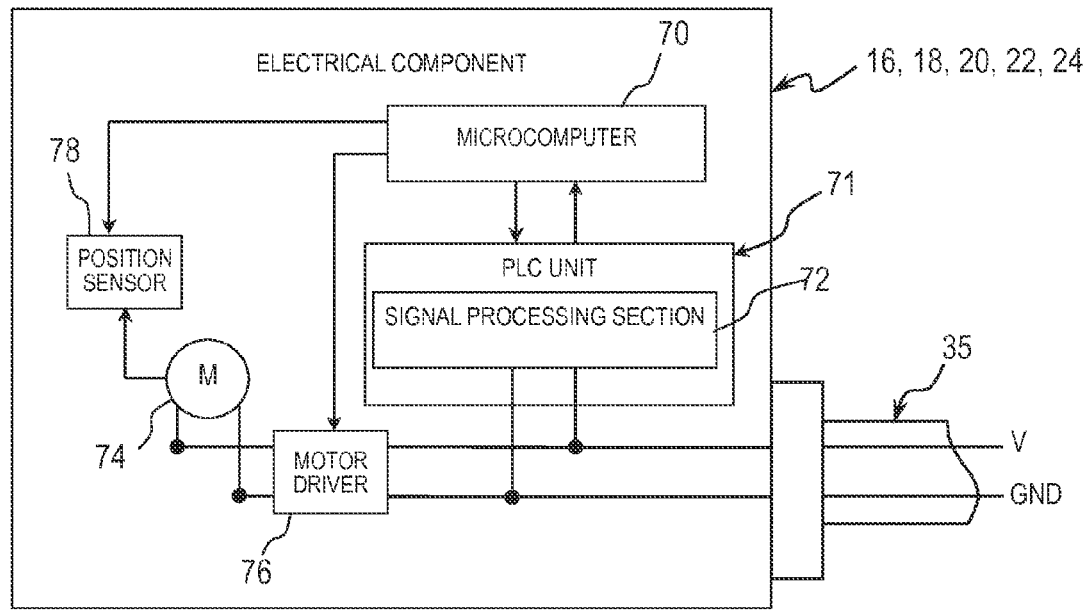
FIG. 5 is a schematic block diagram showing a basic configuration of each of the electrical components of the bicycle component control apparatus.

Turning now to FIG. 5, the basic configuration of the controlling part of each of the electrical bicycle components 16, 18, 20, 22 and 24 will now be discussed. The mechanical structures of the electrical bicycle components 16, 18, 20, 22 and 24 are well known in the bicycle field. For this reason, the mechanical structures of the electrical bicycle components 16, 18, 20, 22 and 24 are not illustrated and/or discussed in detail herein. Each of the electrical bicycle components 16, 18, 20, 22 and 24 is basically provided with a sub-microcomputer 70 and a power line communication (PLC) unit 71 that includes a signal processing section 72.

The power line communication unit 71 is connected to the power supply 25 for receiving electric power. The sub-microcomputer 70 includes control circuits with one or more CPUs, storage units, computation units and the like. The sub-microcomputer 70 also includes software that outputs predetermined control parameters in accordance with adjustment signals outputted from the controller 14. In particular, using the signal processing section 72, the sub-microcomputer 70 also operates the corresponding one of the electrical bicycle components 16, 18, 20, 22 and 24 in accordance with adjustment signals outputted from the corresponding one of the input devices 26, 28, 30, 32 and 34. The sub-microcomputers 70 together with the main microcomputer 60 form the bicycle adjusting controller. It will be understood from this disclosure that the main microcomputer 60 can be eliminated such that the input devices 26, 28, 30, 32 and 34 directly communicate with the electrical bicycle components 16, 18, 20, 22 and 24 as needed and/or desired. If the main microcomputer 60 is eliminated, the signal processing section 72 for each electrical bicycle component constitutes a power supply sensor that detects a power level of the power supply. The signal processing section 72 can be integrated into the sub-microcomputer 70 or a separate component as needed and/or desired.

Still referring to FIG. 5, each of the electrical bicycle components 16, 18, 20, 22 and 24 is also provided with an actuator 74, an actuator driver 76 and a position sensor 78. The actuator 74 is a reversible motor that is configured and arranged to drive a valve, a like or the like of the electrical bicycle component. While the actuator 74 is illustrated as a motor in the illustrated embodiments, the actuator 74 can be other types of devices such as a solenoid. The actuator 74 adjust the position of a part to set a state of the electrical bicycle component, e.g., a lockout state, a damping rate state, a travel-stroke length state, a gear position, a seatpost height position state etc. The actuator driver 76 drives the actuator 74 in response to control signals from the sub-microcomputer 70. The actuator driver 76 includes motor drivers and deceleration units for driving and decelerating the rotation of the actuator 74. The position sensor 78 detects the position of the actuator 74 or other part of the electrical bicycle component that is indicative its current setting position or state. The sub-microcomputer 70 is configured and arranged to control the actuator driver 76 in response to an adjustment signal from the input device for that electrical bicycle component via the controller 14. The sub-microcomputer 70 includes software that controls the actuator 74 in accordance with adjustment signals outputted from the input device for that electrical bicycle component via the controller 14.

Figure 6:
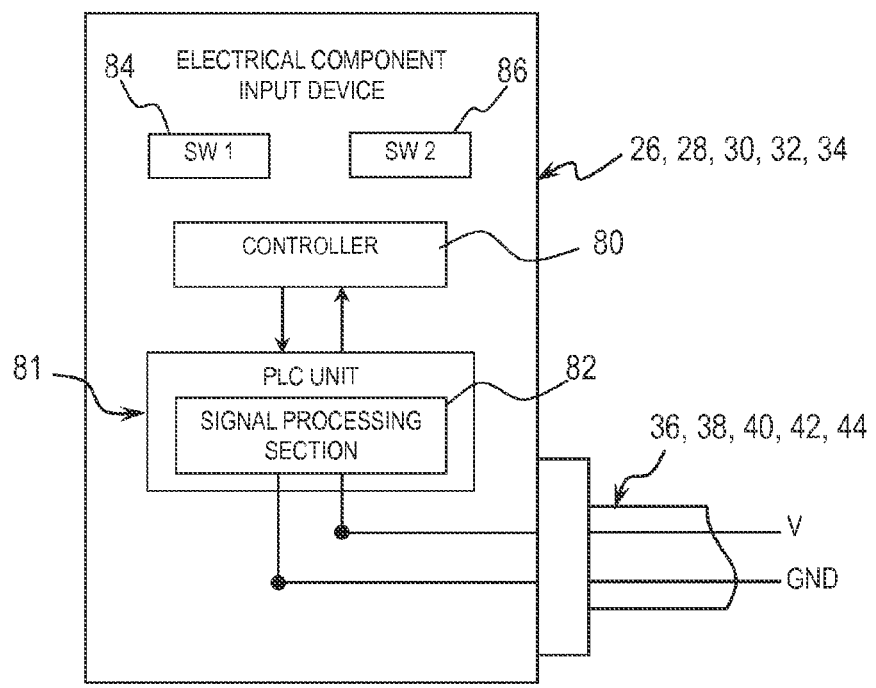
FIG. 6 is a schematic block diagram showing a basic configuration of each of the input devices of the bicycle component control apparatus.

Turning now to FIG. 6, the basic configuration of the controlling part of each of the input devices 26, 28, 30, 32 and 34 will now be discussed. The mechanical structures of the input devices 26, 28, 30, 32 and 34 are well known in the bicycle field. For this reason, the mechanical structures of the input devices 26, 28, 30, 32 and 34 are not illustrated and/or discussed in detail herein. Each of the input devices 26, 28, 30, 32 and 34 is basically provided with a controller 80, a power line communication (PLC) unit 81 that includes a signal processing section 82. Each of the input devices 26, 28, 30, 32 and 34 is also provided with a pair of switches 84 and 86. The power line communication unit 81 is connected to the power supply 25 for receiving electric power. The signal processing section 82 can be integrated into the controller 80 or a separate component as needed and/or desired. The switches 84 and 86 can be any type of switches. Moreover, while each of the input devices 26, 28, 30, 32 and 34 is illustrated as including two switches, it will be apparent that more or less switches can be provided as needed and/or desired. Also, the switch 84 can be configured using the mode switches 51, 52 and 53 such that the switch 84 can simultaneously operate two or more of the electrical bicycle components 16, 18, 20, 22 and 24 with a single input signal as needed and/or desired. Likewise, the switch 86 can be configured using the mode switches 51, 52 and 53 such that the switch 86 can simultaneously operate two or more of the electrical bicycle components 16, 18, 20, 22 and 24 with a single input signal as needed and/or desired.

In this first illustrated embodiment of FIGS. 3 to 6, the bicycle adjusting controller of the bicycle component control apparatus 12 is made of a plurality of microcomputers with a power line communication (PLC) system interconnecting the electrical bicycle components and the input devices. It will be apparent from this disclosure that other configurations can be used for interconnecting the electrical bicycle components and the input devices. For example, the controller 14 could be eliminated and/or wireless communications can be used as explained below.

Figure 8:
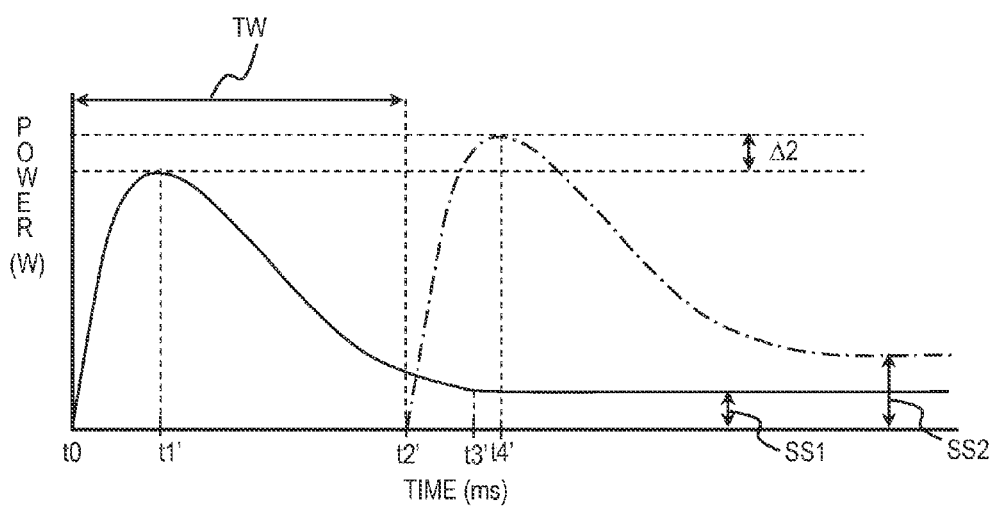
FIG. 8 is a graph illustrating the power fluctuation that occurs in the power line when sequentially starting two actuators (e.g., electric motors) with a partial overlap in the operation of the actuators (e.g., electric motors)
Figure 9:
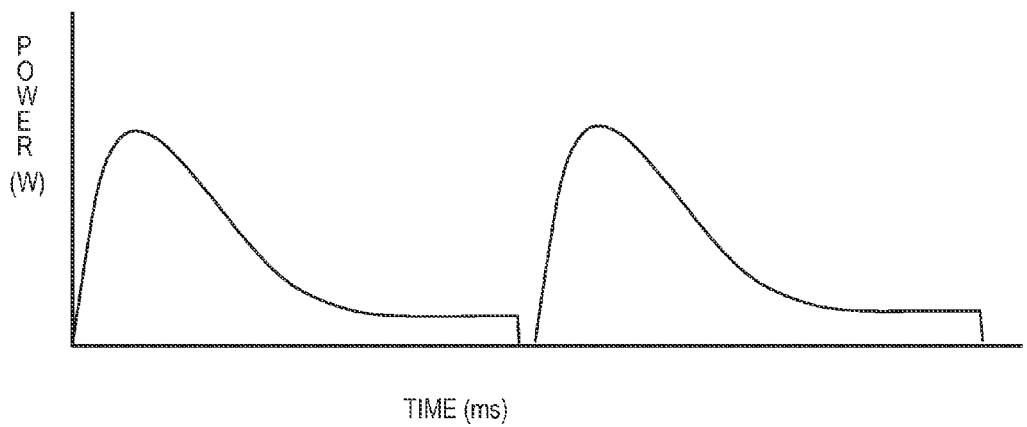
FIG. 9 is a graph illustrating the power fluctuation that occurs in the power line when sequentially starting two actuators (e.g., electric motors) with no overlap in the operation of the actuators (e.g., electric motors)

Referring now to FIGS. 7, 8 and 9, the effect of changing the starting times for operating the electrical bicycle components 16, 18, 20, 22 and 24 will now be discussed in more detail. FIG. 7 is a graph illustrating the power fluctuation that occurs in the power line 35 when simultaneously starting two actuators 74 (e.g., electric motors) in comparison to starting only one of the actuators 74 (e.g., electric motors) at a time. FIGS. 8 and 9 are a graph illustrating the power fluctuation that occurs in the power line 35 when sequentially starting two of the actuators 74. As seen in FIG. 7, the solid line illustrates the power requirement for simultaneously operating two of the actuators 74 in which the two actuators 74 are assumed to be identical for the sake of simplicity.

At time t0, power is simultaneously supplied to the actuators 74 of two of the electrical bicycle components 16, 18, 20, 22 and 24 based on the controller 14 receiving at least one signal from at least one of the input devices 26, 28, 30, 32 and 34. When initially starting two of the actuators 74 simultaneously, the power requirement rises rapidly until it peaks at time t1. The time period from t0 to t1 of FIG. 7 corresponds to the starting operation of the actuators 74 of the electrical bicycle components 16, 18, 20, 22 and 24.

Then, after a few milliseconds, the power requirement falls until time t2. The time period from t1 to t2 of FIG. 7 corresponds to the power transitioning operation of the actuators 74 of the electrical bicycle components 16, 18, 20, 22 and 24.

After time t2, the power requirement levels out at a prescribed power level S2 until the actuators 74 have stopped. The time period from after t2 of FIG. 7 until the actuators 74 are stopped corresponds to the driving operation of the actuators 74 of the electrical bicycle components 16, 18, 20, 22 and 24.

As also seen in FIG. 7, the dash-dotted line illustrates the power requirement for operating only one of the actuators 74. When operating only one of the actuators 74, the peak power (or the peak current) requirement is less than the peak power (or the peak current) requirement for operating two of the actuators 74 simultaneously (i.e., the peak power requirement is less by an amount Δ1). Moreover, the steady state power requirement SS1 for operation of only one of the actuators 74 is less than the steady state power requirement SS2 for simultaneous operation of two of the actuators 74.

In the illustrated example of FIG. 7, the peak power requirement for operating one actuator is approximately half of the peak power requirement for operating simultaneously operating two actuators, since the actuators are assumed to be identical motors for the sake of simplicity. As seen in FIG. 8, when the controller 14 operates the actuators 74 of two of the electrical bicycle components 16, 18, 20, 22 and 24 at different starting times (i.e., the timings of the starting operations are offset), while the power level is below the prescribed power level P1, the peak power requirement only slightly increases (i.e., the peak power requirement increases by an amount Δ2) over the power requirement for operating only one actuator 74 due to the increase amount of power needed to operate the two actuators 74 in an overlapping manner. In other words, FIG. 8 illustrates a case in which the two actuators 74 were operated such that operation of one of the actuators 74 for one of the two electrical bicycle components were started before operation of the other of the two electrical bicycle components is completed. FIG. 9 illustrates a case in which the two actuators 74 were operated such that operation of one of the two electrical bicycle components is started after operation of the other of the two electrical bicycle components is completed while the power level is below the prescribed power level P1. The time from t0 to t2' is longer than a prescribed time TW. For example, the prescribed time TW is longer than 40 ms. The controller 14 can be configured such that the prescribed time TW is adjustably by the user.

Figure 10:
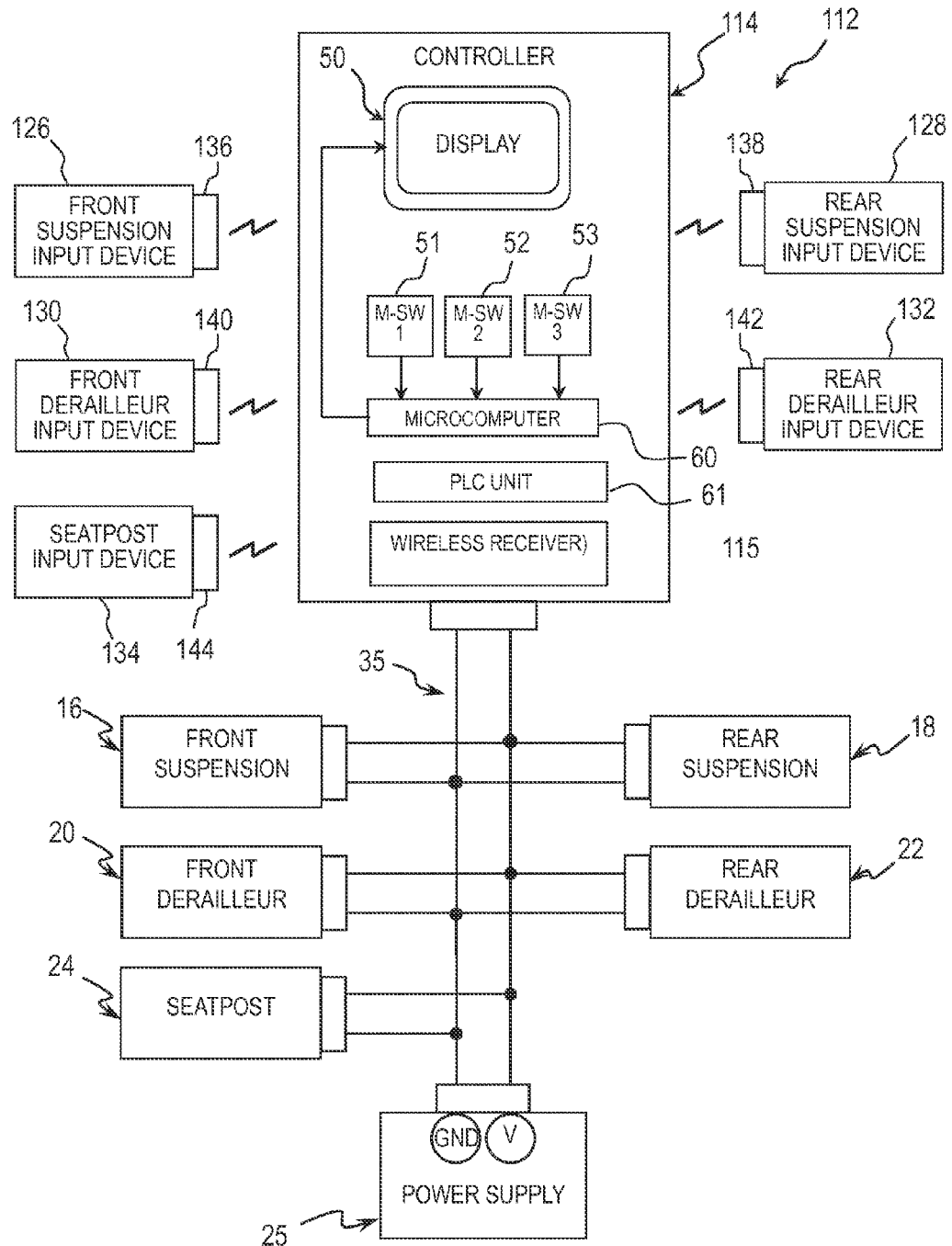
FIG. 10 is an alternative schematic block diagram showing an entire configuration of an alternative bicycle component control apparatus.

Referring now to FIG. 10, a schematic block diagram is illustrated that shows a basic configuration of a bicycle component control apparatus 112 that is provided with a control unit 114 for controlling the electrical bicycle components 16, 18, 20, 22 and 24 in response to manual inputs of input devices 126, 128, 130, 132 and 134, respectively. The parts of the control unit 114 that are identical to the parts of the first embodiment will be given the same reference numbers that are used in describing the first embodiment. Here, the control unit 114 is identical to the controller 14, except that the control unit 114 includes a wireless receiver 115 for wireless communicating with the input devices 126, 128, 130, 132 and 134 instead of via the power lines.

Also, the input devices 126, 128, 130, 132 and 134 are identical to the input devices 26, 28, 30, 32 and 34, except that the input devices 126, 128, 130, 132 and 134 includes transmitters 136, 138, 140, 142 and 144, respectively, instead of using power line communication unit. The transmitters 136, 138, 140, 142 and 144, wirelessly send command signals to the wireless receiver 115 of the control unit 114 in response to manual operation of the input devices 126, 128, 130, 132 and 134. Each of the input devices 126, 128, 130, 132 and 134 includes a battery for supply power to the transmitters 136, 138, 140, 142 and 144.

As seen in FIG. 10, the control unit 114 is electrically coupled to the electrical bicycle components 16, 18, 20, 22 and 24 by the power line 35 in the same manner as in the first embodiment. Of course, the control unit 114 and the electrical bicycle components 16, 18, 20, 22 and 24 can be configured to wireless communicate with each other. Alternatively, the control unit 114 can be eliminated, and the input devices 126, 128, 130, 132 and 134 and the electrical bicycle components 16, 18, 20, 22 and 24 can be configured with a wireless receiver to wireless communicate with each other. In any event, the simultaneous control of the electrical bicycle components 16, 18, 20, 22 and 24, based the power level of the power supply 25, is conducted in the same manner as the first embodiment.

Referring now to FIG. 11, a schematic block diagram is illustrated that shows a basic configuration of a bicycle component control apparatus 212 that is provided with a control unit 214 for controlling electrical bicycle components 216, 218, 220, 222 and 224 in response to manual inputs of input devices 226, 228, 230, 232 and 234, respectively. The electrical bicycle components 216, 218, 220, 222 and 224 are identical to the electrical bicycle components 16, 18, 20, 22 and 24, respectively, except that each of the electrical bicycle components 216, 218, 220, 222 and 224 just has a microcomputer.

Figure 12:
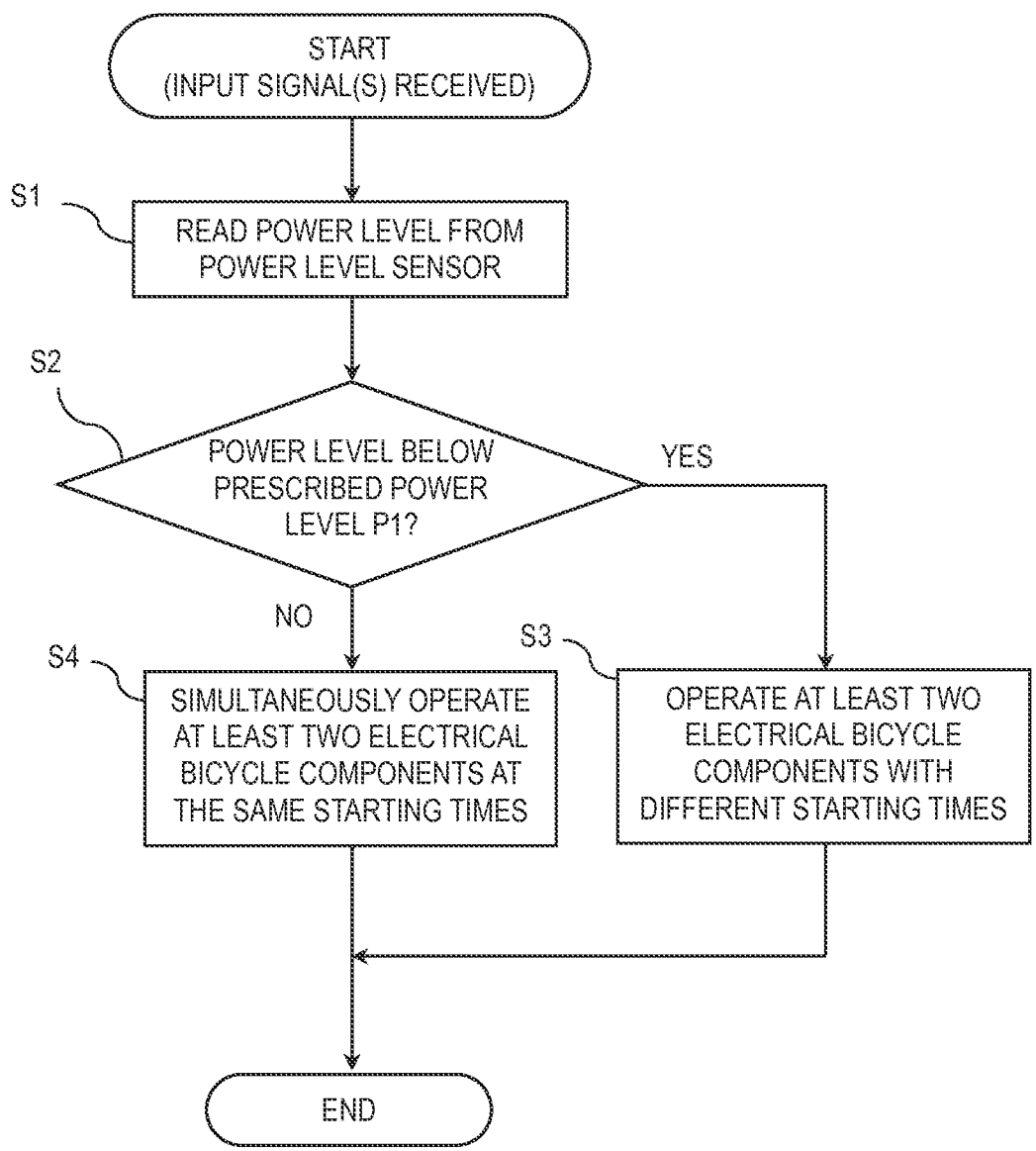
FIG. 12 is a flowchart showing a first control process executed by the master controller of the bicycle component control apparatus while in the power level priority setting.

The parts of the control unit 214 that are identical to the parts of the first embodiment will be given the same reference numbers that are used in describing the first embodiment. Here, the control unit 214 is identical to the controller 14, except that the control unit 214 includes dedicated signal wires POS and a power (voltage) supply sensor 258 instead of using the power lines to communicate for communicating with the input devices 226, 228, 230, 232 and 234 and the electrical bicycle components 216, 218, 220, 222 and 224. In other words, the control unit 214 is connected to the input devices 226, 228, 230, 232 and 234 by power lines 236, 238, 240, 242 and 244, respectively, which each includes at least one dedicated signal wire POS in addition to the ground line and the voltage line. The control unit 214 is connected to the electrical bicycle components 216, 218, 220, 222 and 224 by power line 235, which includes two signal wires for controlling the electrical bicycle components 216, 218, 220, 222 and 224 and in addition to the ground line and the voltage line that supply power from the power supply 25 to the control unit 214 and the electrical bicycle components 216, 218, 220, 222 and 224. In any event, the simultaneous control of the electrical bicycle components 216, 218, 220, 222 and 224, based the power level of the power supply 25, is conducted in the same manner as the first embodiment. accordance Turning now to the flow chart of FIG. 12, in each of the above mentioned embodiments, the bicycle adjusting controller (i.e., the microcomputer 60 acting as a master controller and/or the sub-microcomputers 70 acting as a master controller) conducts the control process of FIG. 12 when at least two electrical bicycle components 16, 18, 20, 22 and 24 are to be started simultaneously or nearly simultaneously while in the power level priority setting. For example, the control process of FIG. 12 will be executed when signals from at least two input devices or a signal from one input device which controls at least two electronic devices are received simultaneously or started nearly simultaneously while in the power level priority setting.

In step S1, the power (voltage) level of the power supply 25 is read from the power supply sensor. In other words, the power supply sensor detects a power level of the power supply 25 being supplied from the power supply 25 to the electrical bicycle components. The power (voltage) level is then transmitted to one or both of the microcomputers 60 and 70. Then the process proceeds to step S2.

In step S2, the bicycle adjusting controller then determines if the power (voltage) level of the power supply 25 is below the first prescribed power level P1. If the power (voltage) level is below the first prescribed power level P1, then the process proceeds to step S3.

In step S3, the bicycle adjusting controller output predetermined control parameters for operating at different starting times of those electrical bicycle components 16, 18, 20, 22 and 24, which would otherwise be simultaneously operated while the power level is below the prescribed power level. In this way, sufficient power is available for completing the operation that could not be performed simultaneously.

However, in step S2, if the bicycle adjusting controller determines the power (voltage) level of the power supply 20 is not below the first prescribed power level P1, then the process proceeds to step S4. In step S4, the bicycle adjusting controller outputs commands or signals to simultaneously operate at least two of the electrical bicycle components 16, 18, 20, 22 and 24 at the same starting times. Then, the process returns to the beginning to start again at the next prescribed time interval.

Moreover, the bicycle suspension control apparatus is not limited to illustrated configurations. For example, the bicycle suspension control apparatus can be configured such that the power sensor 62 is disposed on the power supply 25. Also the bicycle suspension control apparatus can be configured such that a microcomputer (not shown) is provided in the power supply 25 with the microcomputer (not shown) of the power supply 25 forming a part of the bicycle adjusting controller. In such a case, the bicycle suspension control apparatus can be further configured such that the microcomputer 60 and at least of the microcomputer 70 and/or the microcomputer (not shown) of the power supply 20 can be combined together.

Figure 13:
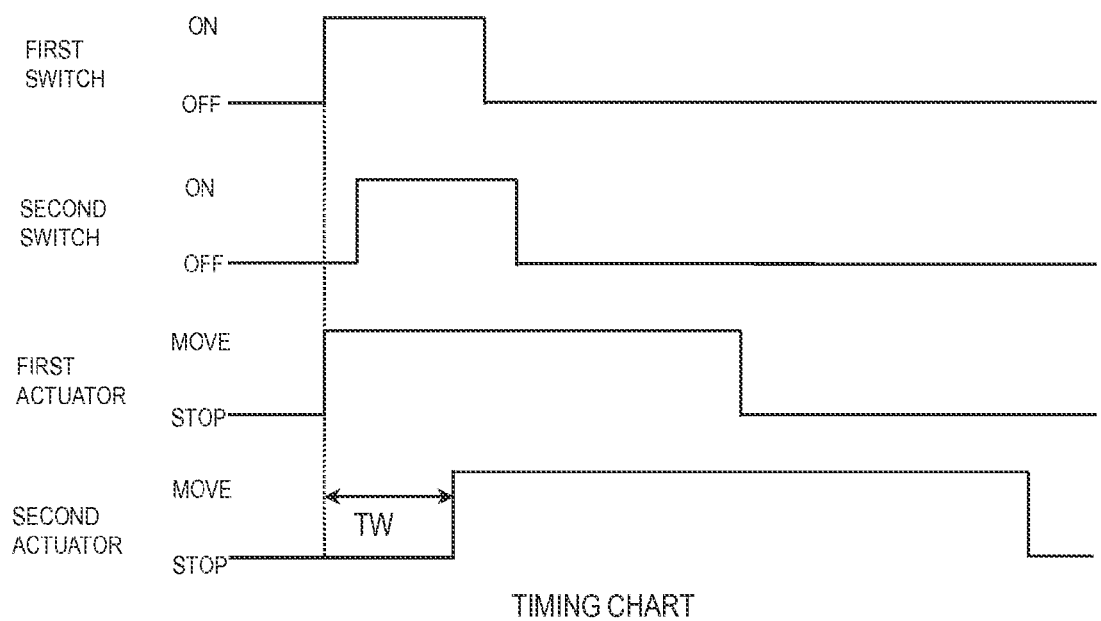
FIG. 13 is a timing chart showing activation of first and second actuators (e.g., electric motors) in response to input signals or commands due to operations of the first and second switches.

Referring now to FIG. 13, a timing chart is illustrated that shows activation of first and second actuators (e.g., electric motors) in response to input signals or commands due to operations of the first and second switches while in the power level priority setting. If the operating timings of the first and second switches are simultaneously or slightly different (below a predetermined time), then first and second actuators (e.g., electric motors) are moved at different starting times (i.e., the timings of the starting operations are offset). The bicycle adjusting controller moves the second actuator after the prescribed time TW from when the first actuator started to move.

The bicycle adjusting controller waits to operate the second actuators after prescribed time TW from when the first actuators started to move. If several components are operated at the different starting times, then the current value become lower as compared to when the same components are operated at the same starting times. Thus, electric lines having a lower current rating can be used. In this case, the electric lines are lighter so that the electrical system of the bicycle becomes more lightweight than is if electric lines with a higher current rating were used.

Figure 14:
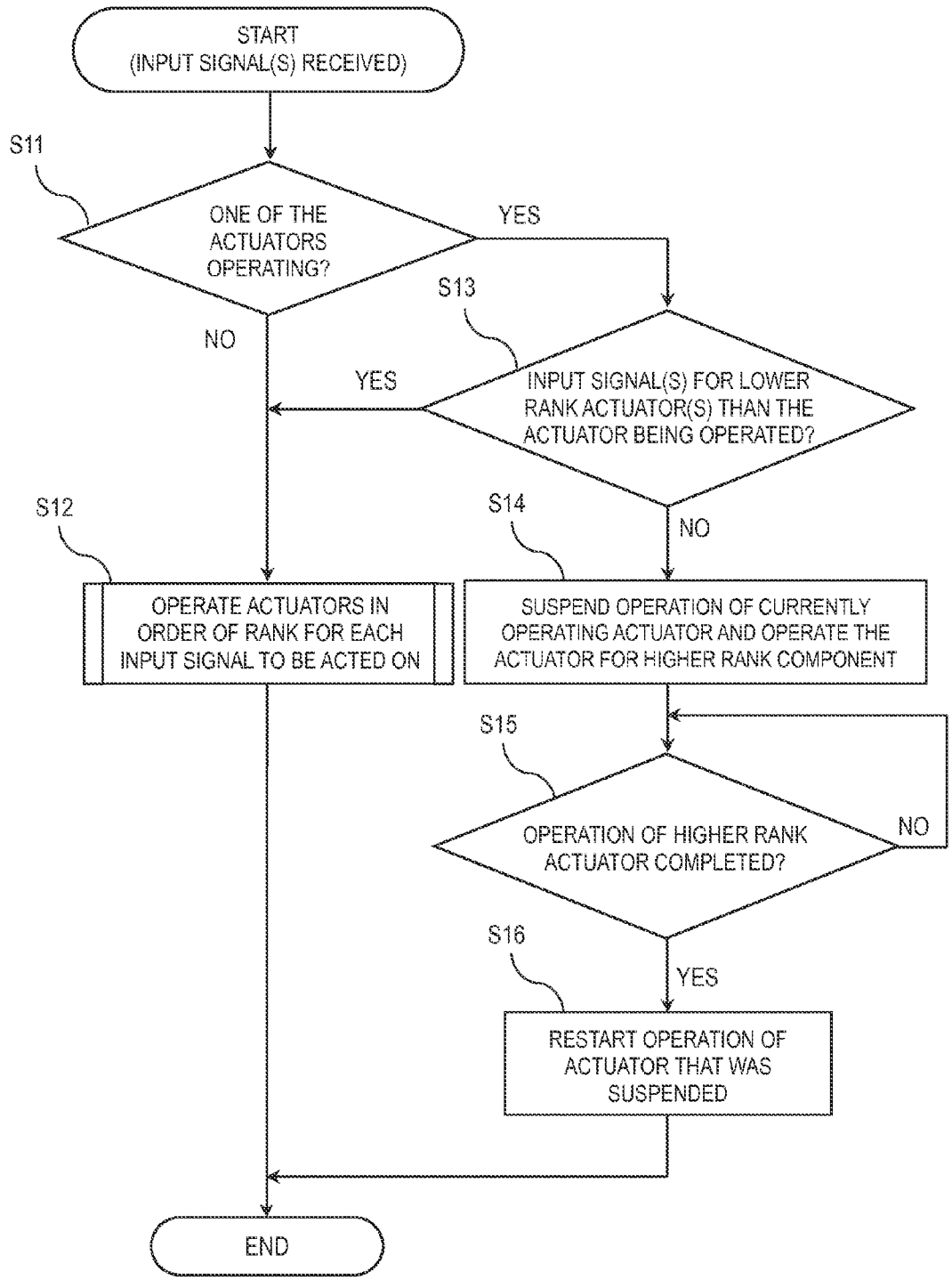
FIG. 14 is a flowchart showing a second control process executed by the master controller of the bicycle component control apparatus while in the component priority setting.
Figure 15:
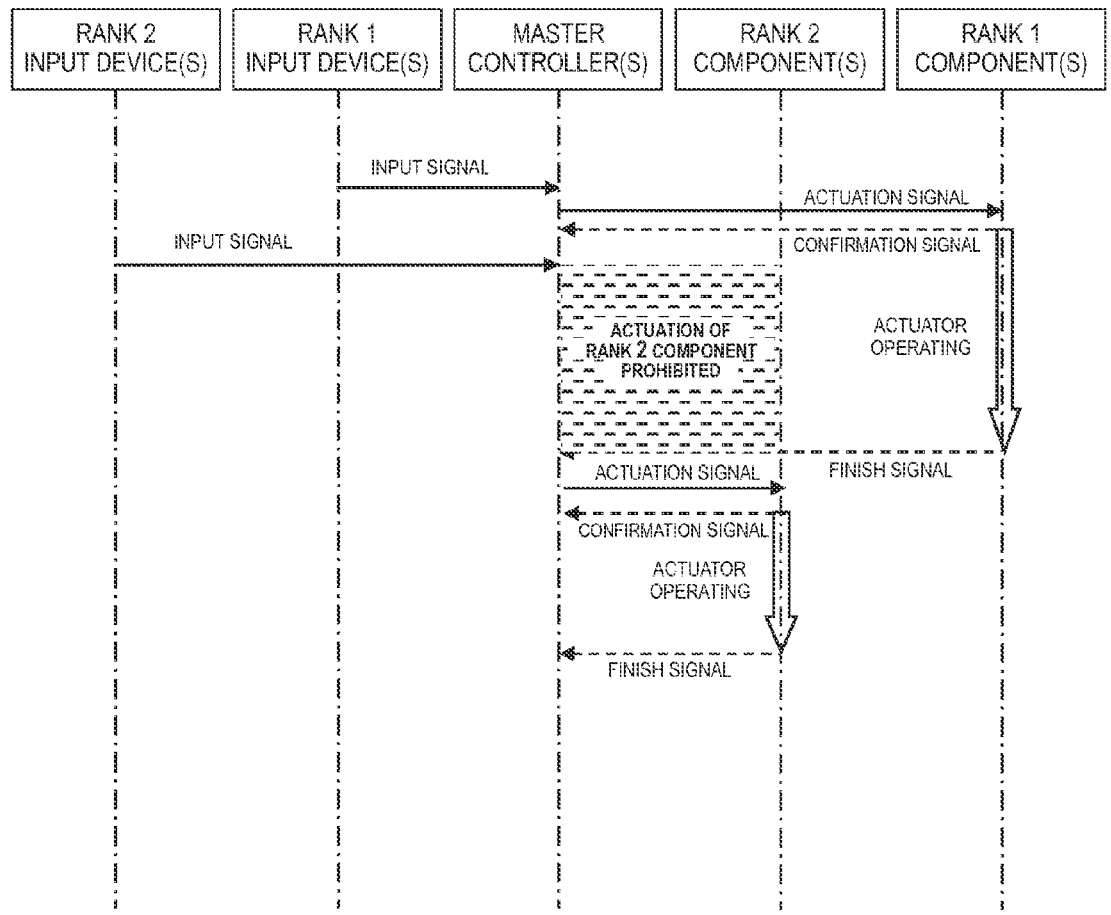
FIG. 15 is a timing diagram showing one possible scenario for controlling the operation of first and second actuators (e.g., electric motors) in response to two input signals or commands due to operations of the first and second input members in which the actuator of the high ranked bicycle component is being operated when an input signal of a lower ranked bicycle component is received.
Figure 16:
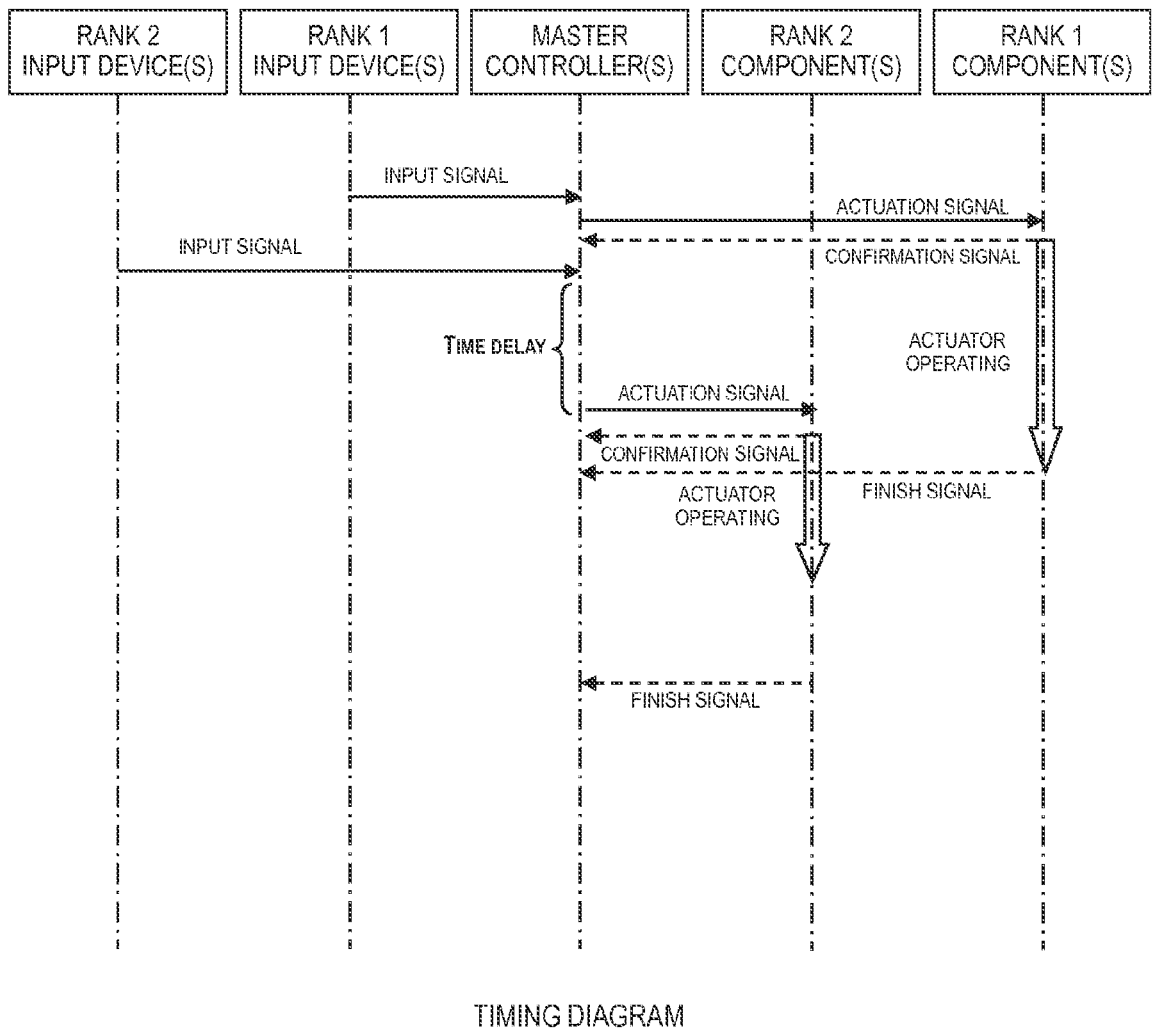
FIG. 16 is a timing diagram showing another possible scenario for controlling the operation of first and second actuators (e.g., electric motors) in response to two input signals or commands due to operations of the first and second input members in which the actuator of the high ranked bicycle component is being operated when an input signal of a lower ranked bicycle component is received.

Referring now to FIGS. 14 to 16, the operation of the electrical bicycle components 16, 18, 20, 22 and 24 by the bicycle adjusting controller (i.e., the microcomputer 60 and/or the sub-microcomputers 70) now will be discussed while set to operate under the component priority setting. In the case of the first illustrated embodiment, the controller 14 preferably acts as a master controller, and has a preset priority ranking stored in memory for the front suspension 16, the rear suspension 18, the front derailleur 20, the rear derailleur 22 and the seatpost 24. However, one of the sub-microcomputers 70 can be the master controller if needed and/or desired. Three examples of possible priority ranking that can be set are shown below in the following tables.

| Rank | A | | B |
|---|---|---|---|
| | Priority Ranking (Example 1) | | |
| 1 | Front Shift Device | = | Rear Shift Device |
| 2 | Front Suspension | > | Rear Suspension |
| 3 | Seatpost | — | |
| | Priority Ranking (Example 2) | | |
| 1 | Front Shift Device | < | Rear Shift Device |
| 2 | Front Suspension | = | Rear Suspension |
| 3 | Seatpost | — | |
| | Priority Ranking (Example 3) | | |
| 1 | Front Shift Device | = | Rear Shift Device |
| 2 | Seatpost | — | |
| 3 | Front Suspension | < | Rear Suspension |

In the above Priority Ranking Tables, the electrical bicycle components of a higher rank will be given priority of operation over the electrical bicycle components of a lower rank, wherein "1" is the highest rank. In the above Priority Ranking Tables, the symbol "=" means that the priority is the same for the electrical bicycle components A and B of the same rank such that the electrical bicycle components A and B of the same rank can move at the same time. The symbol ">" means that the priority is greater for the electrical bicycle component A than for the electrical bicycle component B of the same rank such that the electrical bicycle component A is operated before the electrical bicycle component B of the same rank. The symbol "<" means that the priority is lower for the electrical bicycle component A than for the electrical bicycle component B of the same rank such that the electrical bicycle component A is operated after the electrical bicycle component B of the same rank.

In the case of Example 1, the front and rear shifting devices have the highest rank (i.e., rank 1), which together constitute the first electrical bicycle component, the front and rear suspensions have the middle rank (i.e., rank 2), which together constitute the second electrical bicycle component and the seatpost has the lowest rank (i.e., rank 3), which constitutes the third electrical bicycle component. Thus, in the case of Example 1, operations of the shifting devices have priority over operations of the suspensions and operations of both the shifting devices and the suspensions have priority over operation of the seatpost. Thus, the shifting devices are operated first when input signals are received or issued at the same time as either a suspension adjustment input signal or a seatpost adjustment input signal. Also adjustments of the suspension and the seatpost are suspended when an input signal for shifting is received during operation of the actuator for one of the suspension adjustment devices or the seatpost. In other words, the bicycle adjusting controller moves or operates the shift devices, the suspensions and the seatpost based on the order of rank as preselected by the user and/or preset by the manufacturer.

The priority rank for each of the electrical bicycle components 16, 18, 20, 22 and 24 can be changed by the user by the cycle computer display of the controller 14 (acting as the master controller) or a personal computer via graphical user interface connected to the controller 14 in the case of the first illustrated embodiment. Thus, each of the electrical bicycle components 16, 18, 20, 22 and 24 can be selectively set to be a first electrical bicycle component having a first priority or a second electrical bicycle component having a second priority and so on, wherein the first priority is higher than the second priority and so on. Moreover, the two or more of the electrical bicycle components 16, 18, 20, 22 and 24 can be selectively set to be the first electrical bicycle component having the first priority or the second electrical bicycle component having the second priority and so on.

Turning now to the flow chart of FIG. 14, in each of the above mentioned embodiments, the master controller (i.e., the microcomputer 60) in conjunction with the sub-microcomputers 70 conducts the control process of FIG. 14 when at least two electrical bicycle components are to be started simultaneously or nearly simultaneously while in the component priority setting. For example, the control process of FIG. 14 will be executed when signals from at least two input devices or a signal from one input device which controls at least two electrical bicycle components are received simultaneously or started nearly simultaneously while in the component priority setting. Also, the control process of FIG. 14 will be executed when the master controller merely issues a signal to control at least two electrical bicycle components simultaneously or nearly simultaneously while in the component priority setting.

In step S11, the master controller determines if one of the actuators 74 is operating. In other words, if one of the actuators 74 is operating, then the master controller needs to operate the actuators 74 according to a preset ranking of the electrical bicycle components as selected by the user or preset by the manufacturer.

If the master controller determines in step S11 that none of the actuators 74 are operating, then the process proceeds to step S12. In step S12, the master controller processes the input signal(s) to operate in the electrical bicycle components in the order of rank for each input signal that is received or issued. In other words, the master controller is configured to operate the electrical bicycle components in an order based on predetermined priority information that is stored in memory. Then, after step S12, the process of FIG. 14 returns to the beginning to start again at the next prescribed time interval.

For example in the case of Example 1, if the master controller issues input signals to simultaneously operate the front and rear shift devices and the front and rear suspensions, then the master controller will first simultaneously operates the front and rear shift devices. Then after the driving operations of the front and rear shift devices are completed, the master controller will sequentially operates the front and rear suspensions with different start times such that the starting operations (i.e., the time period from t1 to t2 of FIG. 7) of the front and rear suspensions do not overlap.

Alternatively, in the case of Example 1 and the master controller issuing input signals to simultaneously operate the front and rear shift devices and the front and rear suspensions, the master controller can sequentially operates the front and rear suspensions such that the starting operation of the front suspension is started after the starting operations of the front and rear shift devices and before the driving operations of the front and rear shift devices are completed.

If the master controller determines in step S11 that one of the actuators 74 is operating, then the process proceeds to step S13. In step S13, the master controller determines if the input signal(s) are for a lower rank of actuator than the actuator that is currently being operated. If the actuator that is currently being operated has a higher rank than any of the actuator(s) corresponding to the input signal(s), then the process proceeds to step S12 operate in the electrical bicycle components as illustrated in FIGS. 15 and 16. Thus, in step S12, the master controller processes the input signal(s) to operate in the electrical bicycle components in the order of rank for each input signal that is received or issued as previously mentioned.

Figure 17:
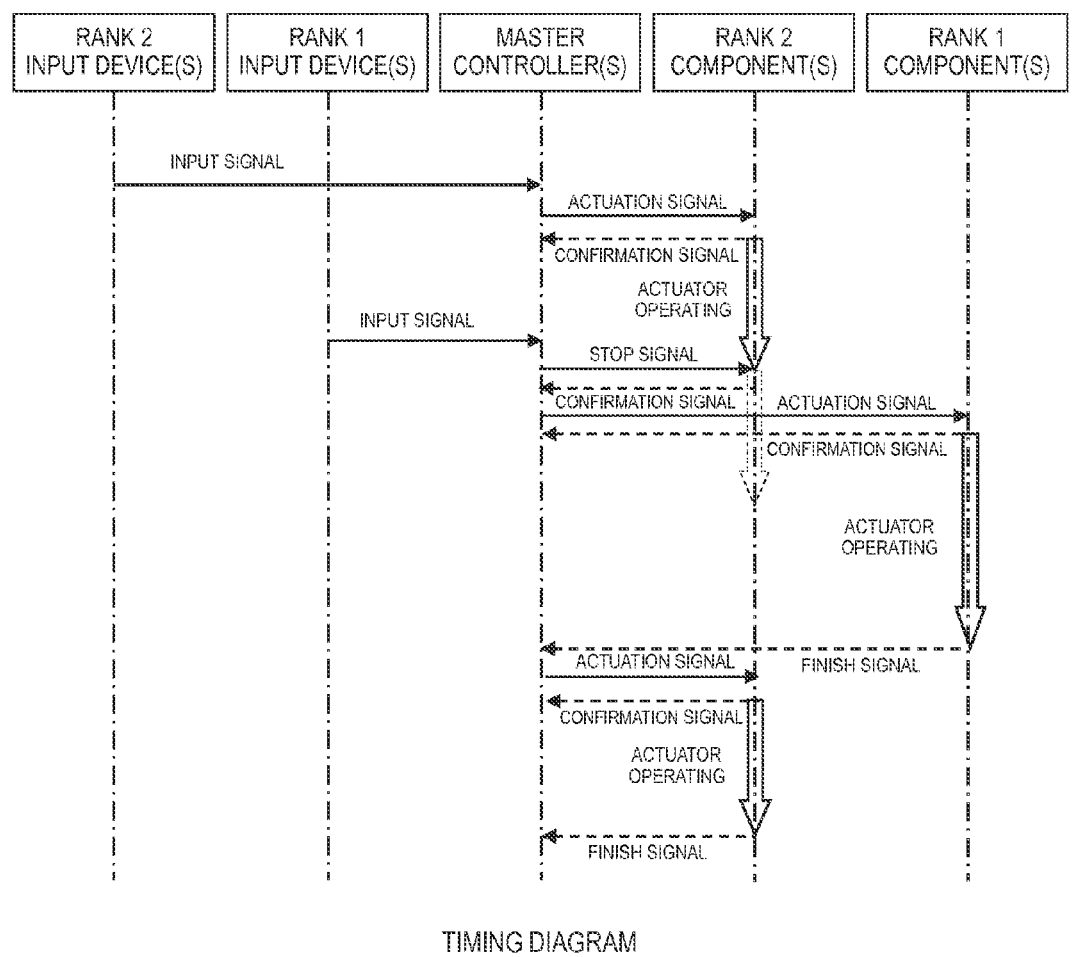
FIG. 17 is a timing diagram showing one possible scenario for controlling the operation of first and second actuators (e.g., electric motors) in response to two input signals or commands due to operations of the first and second input members in which the actuator of the low ranked bicycle component is being operated when an input signal of a higher ranked bicycle component is received.
Figure 18:
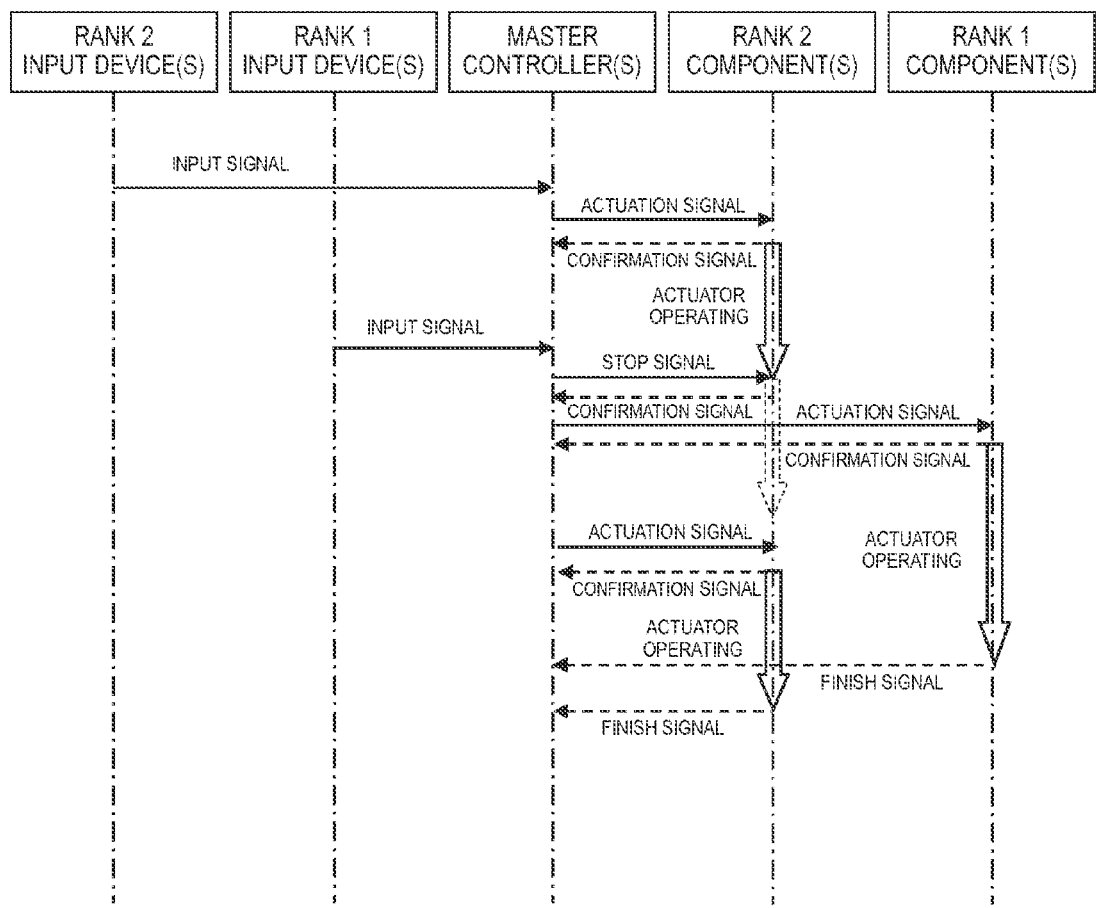
FIG. 18 is a timing diagram showing another possible scenario for controlling the operation of first and second actuators (e.g., electric motors) in response to two input signals or commands due to operations of the first and second input members in which the actuator of the low ranked bicycle component is being operated when an input signal of a higher ranked bicycle component is received.

If the master controller determines in step S13 that the currently operated actuator has a lower rank than the rank of any of the actuator(s) corresponding to the input signal(s), then the process proceeds to step S14. In step S14, the master controller suspends operation of currently operating actuator and starts the operation of the higher rank electrical bicycle component as illustrated in FIGS. 17 and 18. After suspending operation of the lower rank electrical bicycle component(s) and starting operation of the higher rank electrical bicycle component(s), the process proceeds to step S15. In step S15, the master controller determines if the operation of the higher rank actuator has completed. If the master controller determines in step S15 that the operation of the higher rank actuator(s) has completed, then the master controller proceeds to step S16 to restart the lower rank electrical bicycle component(s) as illustrated in FIG. 17. Then, after step S16, the process of FIG. 14 returns to the beginning to start again at the next prescribed time interval.

Alternatively, step S15 can be modified such that the master controller determines if the "starting operation" of the higher rank actuator has passed. If the master controller determines in the modified step S15 that the operation of the "starting operation" of higher rank actuator has passed, then the master controller restarts the lower rank electrical bicycle component(s) before the higher rank actuator(s) has completed the operation of the lower rank electrical bicycle component(s) as illustrated in FIG. 18.

FIGS. 15 and 16 diagrammatically illustrate two possible scenarios of the control processes for this situation of an input signal for a lower rank component being received or issued while a higher rank component is being operated. While FIGS. 15 and 16 diagrammatically illustrate two input signals from two distinct input devices being sent into the master controller, the two input signals could be merely issued by the master controller based on a prestored program for adjusting the electrical bicycle components in response to changes in the bicycle operating condition. In any event, FIGS. 15 and 16 diagrammatically illustrate the master controller being configured to prohibit operation of a second electrical bicycle component having a rank of a lower priority than a first electrical bicycle component while the starting operation of the first electrical bicycle component is occurring.

In FIG. 15, the master controller changes the start time of the operation of the second (lower rank) electrical bicycle component such that operation of the first (higher rank) electrical bicycle component is completed before operation of the second (lower rank) electrical bicycle component is started. In other words, in the control process of FIG. 15, the master controller is configured to control the first and second electrical bicycle components such that operation of the first (higher rank) electrical bicycle component is completed before operation of the second (lower rank) is electrical bicycle component started. On the other hand, in FIG. 16, the master controller changes the start time of the operation of the second electrical bicycle component such that operation of the second (lower rank) electrical bicycle component is started before operation of the first (higher rank) electrical bicycle component is completed but after the "starting operation" of the first (higher rank) electrical bicycle component as has passed. In other words, in the control process of FIG. 16, the master controller is configured to control the first and second electrical bicycle components such that operation of the second (lower rank) electrical bicycle component is started before the first (higher rank) electrical bicycle component is completed.

In this way, the operation of the higher rank electrical bicycle component starts before the operation of the electrical bicycle component that was operating is completed.

In FIG. 17, the master controller suspends the second electrical bicycle component having the lower priority than the first electrical bicycle component upon receiving the first signal during the operation of the second (lower rank) electrical bicycle component. The master controller then operate the first (higher rank) electrical bicycle component, and restarts the operation of the second (lower rank) electrical bicycle component if operation of the first electrical bicycle component has finished. In other words, in the control process of FIG. 17, the master controller is further configured to control the first and second electrical bicycle components such that operation of the first (higher rank) electrical bicycle component is completed before operation of the second (lower rank) electrical bicycle component is started. Completion of the operation of the first electrical bicycle component can be accomplished in several ways such as with a finish signal, using a sensor, or upon a prescribed period of time elapsing. On the other hand, in the control process of FIG. 18, after the master controller suspends the operation of the second (lower rank) electrical bicycle component upon receiving the first signal during the operation of the second (lower rank) electrical bicycle component, the master controller then operate the first (higher rank) electrical bicycle component, and restarts the operation of the second (lower rank) electrical bicycle component before operation of the first electrical bicycle component has finished, but after the "starting operation" of the first (higher rank) electrical bicycle component as has passed. In other words, in the control process of FIG. 17, the master controller is further configured to control the first and second electrical bicycle components such that operation of the first (higher rank) electrical bicycle component is completed before operation of the second (lower rank) electrical bicycle component is started.

Figure 19:
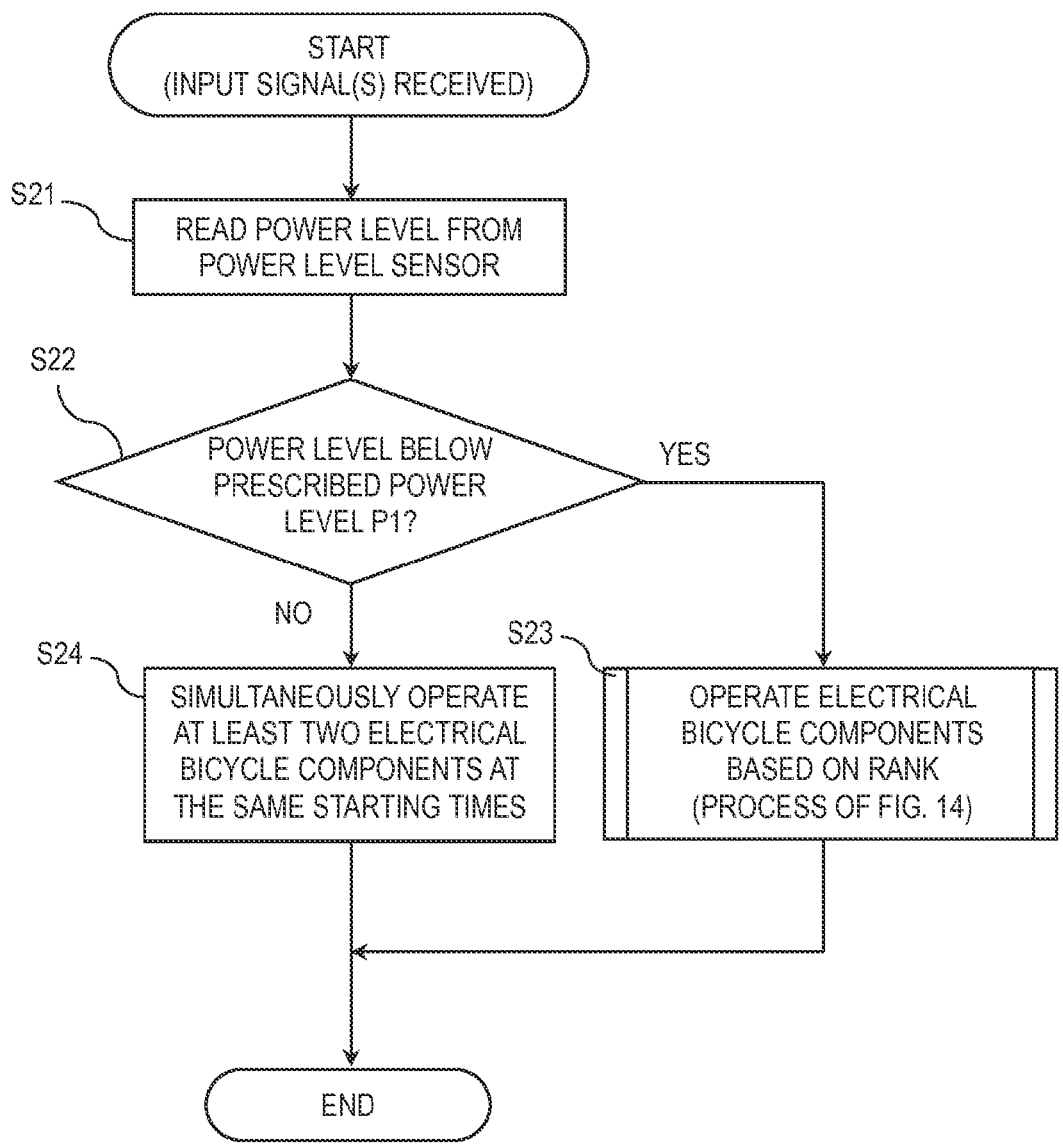
FIG. 19 is a flowchart showing a third control process executed by the master controller of the bicycle component control apparatus while in the hybrid priority setting.

The flow chart of FIG. 19, in each of the above mentioned embodiments, the master controller (i.e., the microcomputer 60) in conjunction with the sub-microcomputers 70 conducts the control process of FIG. 19 when at least two electrical bicycle components 16, 18, 20, 22 and 24 are to be started simultaneously or nearly simultaneously while in the component priority setting. For example, the control process of FIG. 19 will be executed when signals from at least two input devices or a signal from one input device which controls at least two electronic devices are received simultaneously or started nearly simultaneously while in the hybrid priority setting. The master controller (i.e., the microcomputer 60) may execute the control process of FIG. 19 while in the hybrid priority setting.

In step S21, the power (voltage) level of the power supply 25 is read from the power supply sensor. In other words, the power supply sensor detects a power level of the power supply 25 being supplied from the power supply 25 to the electrical bicycle components. The power (voltage) level is then transmitted to one or both of the microcomputers 60 and 70. Then the process proceeds to step S22.

In step S22, the master controller then determines if the power (voltage) level of the power supply 25 is below the first prescribed power level P1. If the power (voltage) level is below the first prescribed power level P1, then the process proceeds to step S23.

In step S23, the master controller performs the control process of FIG. 14. In other words, each of the electrical bicycle components is operated in accordance with a priority rank that has been preset as discussed above. In this way, sufficient power is available for completing the operations of the electrical bicycle components. Then, after step S23, the process returns to the beginning to start again at the next prescribed time interval.

However, in step S22, if the master controller determines the power (voltage) level of the power supply 20 is not below the first prescribed power level P1, then the process proceeds to step S24. In step S24, the master controller outputs commands or signals to simultaneously operate at least two of the electrical bicycle components at the same starting times and/or at different times depending the actuation of the input devices and/or the automatic control program. Then, the process returns to the beginning to start again at the next prescribed time interval.

Now, the interaction between the controllers of the electrical bicycle components and the master controller will be discussed with reference to FIGS. 17 and 18 using the above mentioned Example 1.

In the case of Example 1, the master controller is configured to operate the front and rear shift devices in parallel and give priority of operation to the front and rear shift devices over the front and rear suspensions and the seatpost. For example, if the front shift device is operating, and the master controller receives a shift change signal from the rear shift input device, the master controller then sends a signal to the controller (microcomputer) of rear shift input device to start moving the rear shift device to perform a shift without suspending the operation of the front shift device. In other words, the rear shift device can be operated before the operation of the front shift device has finished.

Also when the actuator of the suspension is moving and the master controller receives a shift change signal from the front and/or rear shift input device, the master controller then sends a signal to the controller (microcomputer) of the suspension to immediately stop moving of the actuator of the suspension (i.e., suspend operation of the actuator for the suspension). Then the master controller sends a signal to the controller of the actuator of the front and/or rear to start moving the front and/or rear to perform a shifting operation. After the front and/or rear shift device finishes movement, the master controller sends a signal to the controller of the suspension to move of the actuator of the suspension to complete the adjustment of the suspension.

Also in the case of Example 1, when the seatpost is moving and the master controller receives a suspension setting change signal from the suspension input device, the master controller then sends a signal to the controller (microcomputer) of the seatpost to immediately stop moving of the actuator of the seatpost (i.e., suspend operation of the actuator for the seatpost). Then the master controller sends a signal to the controller of the actuator of the suspension to perform a setting adjustment. After the actuator of the suspension finishes movement, the master controller sends a signal to the controller of the seatpost to move of the actuator of the seatpost.

In addition in the case of Example 1, when the seatpost is moving and the master controller receives a suspension setting change signal from the suspension input device, the master controller then sends a signal to the controller (microcomputer) of the seatpost to immediately stop moving of the actuator of the seatpost (i.e., suspend operation of the actuator for the seatpost). Then the master controller sends a signal to the controller of the actuator of the suspension to perform a setting adjustment. After the actuator of the suspension finishes movement, the master controller sends a signal to the controller of the seatpost to move of the actuator of the seatpost.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control apparatus comprising:
a controller configured to output a first actuation signal to operate a first electrical bicycle component in response to receiving a first signal from a first input member, to output a second actuation signal to operate a second electrical bicycle component in response to receiving a second signal from a second input member, to store predetermined priority information indicating priority ranks for operating the first and second electrical bicycle components, and to receive a change of the predetermined priority information by a user,
the controller being configured to control the first and second electrical bicycle components based on the predetermined priority information such that
when the predetermined priority information is such that operation of the first electrical bicycle component has a higher priority rank than operation of the second electrical bicycle component, the controller prohibits outputting the second actuation signal to the second electrical bicycle component in response to receiving the second signal from the second input member if the first electrical bicycle component is being operated by the first actuation signal in response to receiving the first signal, and
when the predetermined priority information is such that operation of the second electrical bicycle component has a higher priority rank than operation of the first electrical bicycle component, the controller prohibits outputting the first actuation signal to the first electrical bicycle component in response to receiving the first signal from the first input member if the second electrical bicycle component is being operated by the second actuation signal in response to receiving the second signal.

2. The bicycle component control apparatus according to claim 1, wherein
the controller changes a start time of operation of the one of the first electrical bicycle component and the second electrical bicycle component that has the lower priority rank.

3. The bicycle component control apparatus according to claim 1, wherein
the controller prohibits operation of the one of the first electrical bicycle component and the second electrical bicycle component that has the lower priority rank while a current power requirement is above a first power level.

4. The bicycle component control apparatus according to claim 1, wherein
the controller is further configured to set at least two different states of at least two of a bicycle front suspension, a bicycle rear suspension, a front shift device, a rear shift device and a seatpost.

5. The bicycle component control apparatus according to claim 1, wherein
the controller is further configured such that when the controller has prohibited outputting the first or second actuation signal to the one of the first and second electrical bicycle components having the lower priority rank, the controller controls the first and second electrical bicycle components such that operation of the one of the first and second electrical bicycle components having the higher priority rank is completed before operation of the one of the first and second electrical bicycle components having the lower priority rank is started.

6. The bicycle component control apparatus according to claim 1, wherein
the controller is further configured such that when the controller has prohibited outputting the first or second actuation signal to the one of the first and second electrical bicycle components having the lower priority rank, the controller controls the first and second electrical bicycle components such that operation of the one of the first and second electrical bicycle components having the lower priority rank is started before operation of the one of the first and second electrical bicycle components having the higher priority rank is completed after starting the operation of the one of the first and second electrical bicycle components having the higher priority rank.

7. The bicycle component control apparatus according to claim 1, wherein
the controller is further configured to suspend operation of the one of the first and second electrical bicycle components having the lower priority rank upon receiving the one of the first signal and the second signal corresponding to the one of the first and second electrical bicycle components having the higher priority rank during the operation of the one of the first and second electrical bicycle components having the lower priority rank, and operate the one of the first and second electrical bicycle components having the higher priority rank, and
the controller is further configured to restart the operation of the one of the first and second electrical bicycle components having the lower priority rank if operation of the one of the first and second electrical bicycle components having the higher priority rank has finished.

8. The bicycle component control apparatus according to claim 1, wherein
the controller is further configured to operate the one of the first and second electrical bicycle components having the higher priority rank and a third electrical bicycle component in parallel upon receiving both the first signal and a third signal from a third input member before operation of the first electrical bicycle component has finished.

9. The bicycle component control apparatus according to claim 8, wherein
the controller is further configured to suspend operation of the one of the first and second electrical bicycle components having the lower priority rank upon receiving the third signal during the operation of the one of the first and second electrical bicycle components having the lower priority rank, and operate the third electrical bicycle component, and the controller is further configured to restart the operation of the one of the first and second electrical bicycle components having the lower priority rank if operation of the third electrical bicycle component has finished.

10. The bicycle component control apparatus according to claim 8, wherein
the controller is further configured to suspend operation of one of the first and second electrical bicycle components having the lower priority rank upon receiving the third signal during the operation of the one of the first and second electrical bicycle components having the lower priority rank, and operate the third electrical bicycle component, and the controller is further configured to restart the operation of the one of the first and second electrical bicycle components having the lower priority rank before operation of the third electrical bicycle component has finished.

11. The bicycle component control apparatus according to claim 1, wherein
the one of the first and second electrical bicycle components having the higher priority rank includes at least one of a front shift device and a rear shift device, and the one of the first and second electrical bicycle components having the lower priority rank includes at least one of a bicycle front suspension and a bicycle rear suspension.

12. The bicycle component control apparatus according to claim 1, wherein
the one of the first and second electrical bicycle components having the higher priority rank includes a bicycle front suspension, and the one of the first and second electrical bicycle components having the lower priority rank includes a bicycle rear suspension.

13. The bicycle component control apparatus according to claim 1, wherein
the one of the first and second electrical bicycle components having the higher priority rank includes at least one of a front shift device and a rear shift device, and the one of the first and second electrical bicycle components having the lower priority rank is a seatpost.

14. The bicycle component control apparatus according to claim 1, wherein
the one of the first and second electrical bicycle components having the higher priority rank includes at least one of a bicycle front suspension and a bicycle rear suspension, and the one of the first and second electrical bicycle components having the lower priority rank is a seatpost.

15. The bicycle component control apparatus according to claim 1, wherein
the one of the first and second electrical bicycle components having the higher priority rank includes one of a front shift device and a rear shift device, and the one of the first and second electrical bicycle components having the lower priority rank includes the other of the front and rear shift devices.

16. The bicycle component control apparatus according to claim 1, further comprising
a power supply arranged to supply electric power to each of the controller, the first electrical bicycle component, and the second electrical bicycle component;
the controller being configured to prohibit operation of the one of the first and second electrical bicycle components having the lower priority rank only if a power level of the power supply is below a prescribed power level.

17. A bicycle control apparatus comprising:
a controller configured to operate a bicycle shift device in response to receiving a first signal from a first input member, to operate a bicycle suspension in response to receiving a second signal from a second input member, and to store predetermined priority information indicating priority ranks for operating the bicycle shift device and the bicycle suspension,
the controller being configured to control the bicycle shift device and the bicycle suspension based on the predetermined priority information, the operation of the bicycle shift device having a first priority rank and the operation of the bicycle suspension having a second priority rank, the first priority rank being higher than the second priority rank.

18. The bicycle component control apparatus according to claim 17, wherein
the controller is further configured to control the bicycle shift device and the bicycle suspension such that when the first signal and the second signal are received simultaneously or the second signal is received during operation of the bicycle shift device, then operation of the bicycle suspension is started before operation of the bicycle shift device is completed after starting the operation of the bicycle shift device.

19. The bicycle component control apparatus according to claim 17, wherein
the controller is further configured to suspend operation of the bicycle suspension and operate the bicycle shift device upon receiving the first signal during the operation of the bicycle suspension, and to restart the operation of the bicycle suspension upon operation of the bicycle shift device being finished after the suspension of operation of the bicycle suspension.

20. The bicycle component control apparatus according to claim 17, wherein
the controller is further configured to suspend operation of the bicycle suspension and operate the bicycle shift device upon receiving the first signal during the operation of the bicycle suspension, and to restart the operation of the bicycle suspension before operation of the bicycle shift device is completed after starting the operation of the bicycle shift device.

21. A bicycle component control apparatus comprising:
a controller configured to output a first actuation signal to operate a bicycle shift device in response to receiving a first signal from a first input member, to output a second actuation signal to operate at least one other electrical bicycle component in response to receiving a second signal from a second input member, and to store predetermined priority information indicating priority ranks for operating the bicycle shift device and the at least one other electrical bicycle component,
the controller being configured to control the bicycle shift device and the at least one other electrical bicycle component based on the predetermined priority information, the operation of the bicycle shift device having a highest priority rank.

22. The bicycle component control apparatus according to claim 21, wherein
the controller is further configured to control the bicycle shift device and the at least one other electrical bicycle component such that when the first actuation signal and the second actuation signal are received simultaneously or the second actuation signal is received during operation of the bicycle shift device, operation of the at least one other electrical bicycle component is started before operation of the bicycle shift device is completed after starting the operation of the bicycle shift device.

23. The bicycle component control apparatus according to claim 21, wherein
the controller is further configured to suspend operation of the at least one other electrical bicycle component upon receiving the first signal during the operation of the at least one other electrical bicycle component, and operate the bicycle shift device, and the controller is further configured to restart the operation of the at least one other electrical bicycle component upon operation of the bicycle shift device being finished.

24. The bicycle component control apparatus according to claim 21, wherein
the controller is further configured to suspend operation of the at least one other electrical bicycle component upon receiving the first signal during the operation of the at least one other electrical bicycle component, and operate the bicycle shift device, and the controller is further configured to restart the operation of the at least one other electrical bicycle component before operation of the bicycle shift device is completed after starting the operation of the bicycle shift device.

\* \* \* \* \*